(12) United States Patent
Tormasov et al.

(10) Patent No.: US 7,941,510 B1
(45) Date of Patent: May 10, 2011

(54) MANAGEMENT OF VIRTUAL AND PHYSICAL SERVERS USING CENTRAL CONSOLE

(75) Inventors: Alexander G. Tormasov, Moscow (RU); Oleg K. Shaikharatov, Moscow (RU)

(73) Assignee: Parallels Holdings, Ltd. (BM)

( * ) Notice: Subject to any disclaimer, the term of this patent is extended or adjusted under 35 U.S.C. 154(b) by 240 days.

(21) Appl. No.: 12/131,889

(22) Filed: Jun. 2, 2008

Related U.S. Application Data

(63) Continuation-in-part of application No. 11/871,115, filed on Oct. 11, 2007, now Pat. No. 7,383,327.

(51) Int. Cl.
*G06F 15/177* (2006.01)
*G06F 9/455* (2006.01)

(52) U.S. Cl. .................. 709/220; 709/223; 718/1
(58) Field of Classification Search .................. 709/220; 718/1
See application file for complete search history.

(56) References Cited

U.S. PATENT DOCUMENTS

| | | | |
|---|---|---|---|
| 6,529,985 B1 | 3/2003 | Deianov et al. | |
| 6,560,613 B1 | 5/2003 | Gylfason et al. | |
| 6,618,736 B1 | 9/2003 | Menage | |
| 6,711,607 B1 | 3/2004 | Goyal | |
| 6,732,211 B1 | 5/2004 | Goyal et al. | |
| 6,754,716 B1 | 6/2004 | Sharma et al. | |
| 6,802,062 B1 | 10/2004 | Oyamada et al. | |
| 6,907,421 B1 | 6/2005 | Keshav et al. | |
| 6,909,691 B1 | 6/2005 | Goyal et al. | |
| 6,948,003 B1 | 9/2005 | Newman et al. | |
| 6,976,258 B1 | 12/2005 | Goyal et al. | |
| 6,985,937 B1 | 1/2006 | Keshav et al. | |
| 7,143,024 B1 | 11/2006 | Goyal et al. | |
| 7,200,622 B2 | 4/2007 | Nakatani et al. | |
| 7,219,354 B1 | 5/2007 | Huang et al. | |
| 7,296,041 B2 | 11/2007 | Nakatani et al. | |
| 2005/0120160 A1 | 6/2005 | Plouffe et al. | |
| 2005/0132325 A1 | 6/2005 | Unbehagen | |
| 2005/0210067 A1 | 9/2005 | Nakatani et al. | |
| 2005/0210074 A1 | 9/2005 | Nakatani et al. | |
| 2005/0235058 A1* | 10/2005 | Rackus et al. | 709/224 |
| 2006/0010176 A1 | 1/2006 | Armington | |

(Continued)

OTHER PUBLICATIONS http://web.archive.org/web/20020607233756/www.ensim.com/products/mgt.sub.1-3platform/sxc/3.sub.120/index.html (2002) cited by other.

(Continued)

*Primary Examiner* — Andrew Caldwell
*Assistant Examiner* — Lin Liu
(74) *Attorney, Agent, or Firm* — Bardmesser Law Group

(57) ABSTRACT

A system, method and computer program product for providing centralized management of multiple Virtual Execution Environments (VEEs) implemented on multiple physical servers. Each VEE is a virtual server. Multiple virtual servers of various types and formats are implemented on multiple physical servers. The physical servers are connected into a network. An intuitive user interface of a central console for remote management and administration of a plurality of virtual servers and multiple physical servers is provided. The system includes server managers controlled from a common control center. The system also includes a database containing configuration data and data related to operation formats of the physical and virtual servers. The database is updated based on configuration parameters acquired from the physical and virtual servers. A server system can be a plurality of physical servers and VEEs implemented on them or it can be a plurality of VEEs executed on one physical server.

26 Claims, 20 Drawing Sheets

U.S. PATENT DOCUMENTS

| | | |
|---|---|---|
| 2006/0184349 A1 | 8/2006 | Goud et al. |
| 2006/0184653 A1 | 8/2006 | van Riel |
| 2006/0195561 A1 | 8/2006 | Keane et al. |
| 2007/0027970 A1 | 2/2007 | Backman et al. |
| 2007/0028238 A1 | 2/2007 | Bennett et al. |
| 2007/0028239 A1* | 2/2007 | Dyck et al. ................ 718/1 |
| 2007/0094367 A1 | 4/2007 | Esfahany et al. |
| 2007/0174658 A1 | 7/2007 | Takamoto et al. |
| 2007/0180314 A1 | 8/2007 | Kawashima et al. |
| 2007/0204266 A1 | 8/2007 | Beaty et al. |
| 2007/0233838 A1 | 10/2007 | Takamoto et al. |
| 2007/0276897 A1 | 11/2007 | Tameshige et al. |
| 2007/0294563 A1 | 12/2007 | Bose |
| 2008/0196043 A1* | 8/2008 | Feinleib et al. ............... 719/319 |

OTHER PUBLICATIONS http://web.archive.org/web/20011230183252/http://www.ensim.com/news/releases/pr071601.shtml (2001) cited by other.

* cited by examiner

Migrate Virtual Private Servers

Select target hardware node where Virtual Private Servers will be migrated to:

| Name | Address |
|---|---|
| Training Server 2 | 10.10.10.01 |
| Training Server 3 | 192.168.95. 10 |

Migrate

Cancel

— 302

☑ Remove private areas from source node after migration
☑ Don't start Virtual Private Servers after migration
☐ Force migration

Management Center Site - Internet — 910

Address: http:// 192.168.95.10:4643/

Group Actions: Change Disk Quota — 920

VPS Statistics

| VPS ID ▽ | Hostname | Used Disc | Used Disc | Disk Quota |
|---|---|---|---|---|
| 101 | VPS101 | 25 % | 41.93 Mb | 166.02 Mb |
| 103 | VPS103 | 10 % | 16.31 Mb | 166.02 Mb |

Set Disk Quota

- ☑ Specify Disc Quota — 930 — [ ] KB ▽ — 931
- ☐ Increase Disc Quota — [ ] KB ▽
- ☐ Decrease Disc Quota — [ ] KB ▽

Back — 941   Submit — 942   Cancel — 943

FIG. 9

MANAGEMENT OF VIRTUAL AND PHYSICAL SERVERS USING CENTRAL CONSOLE

CROSS-REFERENCE TO RELATED APPLICATIONS

This application is a continuation-in part of U.S. patent application Ser. No. 11/871,115 filed on Oct. 11, 2007, entitled MANAGEMENT OF VIRTUAL AND PHYSICAL SERVERS USING GRAPHIC CONTROL PANELS, which is incorporated by reference herein in its entirety.

BACKGROUND OF THE INVENTION

1. Field of the Invention

The present invention relates to a method and system for managing groups of virtual and physical servers, and more particularly, to managing multiple Virtual Execution Environments implemented on multiple physical servers.

2. Description of Related Art

The industry trend of virtualization and isolation of computer system resources makes the task of management and administration more complex. A Virtual Execution Environment (VEE), such as, for example, Virtual Environment (VE) or Virtual Machine (VM) is a type of an isolated VEE where multiple VEEs run on the same physical server simultaneously. Each VE/VM instance executes its own applications. It can also have access to other applications within the VEE.

Typically, there are multiple VEEs created on a host operating system. In such system, applications running within one VEE cannot directly interact with applications running within other VEEs. An example of this type of system is computing environment provided by VMware™. The VMware™ solution provides standardized isolated secured computing environments. This product is typically used as an enterprise level solution. The management application provided to a user creates a centralized configuration server, which updates configurations for all distributed VMware™ Virtual Machines. Some of the most critical parameters controlled by the configuration server are: access to the VMs through user groups and Active Directories, lifetime of each VM, protection of VM from copying or reproduction, network access from each VM, etc.

The VMware™ solution, such as VMware Infrastructure 3 (VI3), provides management of multiple VEEs (i.e., VEs or VMs). This product includes management tools for a virtualization solution for an IT infrastructure. VMware's VI3 virtualizes server's hardware environment. The product's key features include the VirtualCenter management agent, VMware Distributed Resource Scheduler and VMotion. VMotion allows migration of VEEs (i.e., VEs or VMs) from one physical host server to another physical host server. The migration process is implemented between servers without interruption in availability of the VEEs during migration. Technical requirements for this migration process are that the physical hosts need to have access to the same storage area and that they need to have the same network connections. However, VMotion Technology cannot be implemented between CPUs of a different type.

The VMware™ ACE solution provides isolated computing environments. The VMware™ application provides a user with a special configuration server that stores the configuration settings for the VMs. All of the distributed ACE VMs access this server for updating their configuration settings. One of the main parameters controlled by policies in this case is management of user access to the VMs via user permissions and users' group Active Directory. Other controlled parameters are a life-span of each VM from the point of its activation, protection of each VM from copying and network access from each of the distributed VMs.

Another example of a conventional centralized management system is IBM Director, which is a system for remote management and administration. The IBM Director tool allows system administrators to monitor a computer system, collect diagnostic data and remotely configure the system using IBM Director management console. However, the IBM Director also does not provide any means for management of multiple VEEs implemented on multiple servers.

Yet another example of a conventional server management system is HP Systems Insight Manager (SIM). HP SIM provides a centralized utility for managing servers. This utility controls a state of the servers, detects service interruptions and server shut downs, provides monitoring and diagnostics of various server subsystems. HP SIM, like other conventional management systems discussed above, does not meet the needs of virtualization. None of the conventional management systems provide centralized management of multiple VEEs implemented on multiple physical servers.

Virtualization allows running a number of VEEs on the same physical server. Examples of conventional virtualization solutions are virtual systems by VMware, Parallels Software International, Inc., Microsoft Virtual Server, Microsoft/Citrix Terminal Server, Virtuozzo™ by SWSoft, Xen systems by XenSource, Solaris Zones etc. The problem of management and administration of a large set of services and servers for many users is widely known, especially to administrators of web hosting companies and data centers. Each routine operation often requires expensive manual operations, and, when handling thousands of users even on single hardware box with a single operating system, each simple operation, which should be performed hundreds and thousands of times, becomes very expensive. Centralization and simplification of management and administration operations therefore can result in a significant economical benefit.

Thus, centralized management and administration of multiple VEs implemented on multiple physical servers becomes exceedingly critical. A robust server management system is especially important in multi-user systems, such as VE systems. In addition to maintaining efficient allocation of resources, providing multi-user access in a Virtual Execution Environment involves other considerations as well, including security, resource sharing and maximizing server system efficiency. Accordingly, there is a need for a method and system for effective centralized management of multiple VEEs implemented on multiple physical servers.

SUMMARY OF THE INVENTION

The present invention relates to a system, method and computer program product for providing management of multiple VEEs implemented on multiple physical servers, that substantially obviates one or more of the disadvantages of the related art.

More particularly, in an exemplary embodiment, a user interface for management of servers is provided. The user interface, implemented in the exemplary embodiment, is intuitive and user friendly. Multiple VEEs of various types and formats are implemented on multiple physical servers. Each VEE, in accordance with the exemplary embodiment, is a virtual server. The physical servers are connected into a network. The proposed system manages plurality of virtual servers and the physical servers using central console. The system includes server managers controlled from a common control center.

Each server manager has access to all server configurations in order to perform operations with this server. In on embodiment a role of the control center and a server manager can be performed by the same utility. The proposed system also includes a database containing configuration data and data related to operation formats of the physical and the virtual servers. A server system can be a plurality of the physical servers and the virtual servers implemented on them or it can be a plurality of the virtual servers executed on one physical server.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 3 illustrates a user interface of server migration control panel in accordance with an exemplary embodiment;

FIG. 9 illustrates a user interface of a control panel for resource allocation for VEEs in accordance with an exemplary embodiment;

DETAILED DESCRIPTION OF THE PREFERRED EMBODIMENTS

Figure 1:
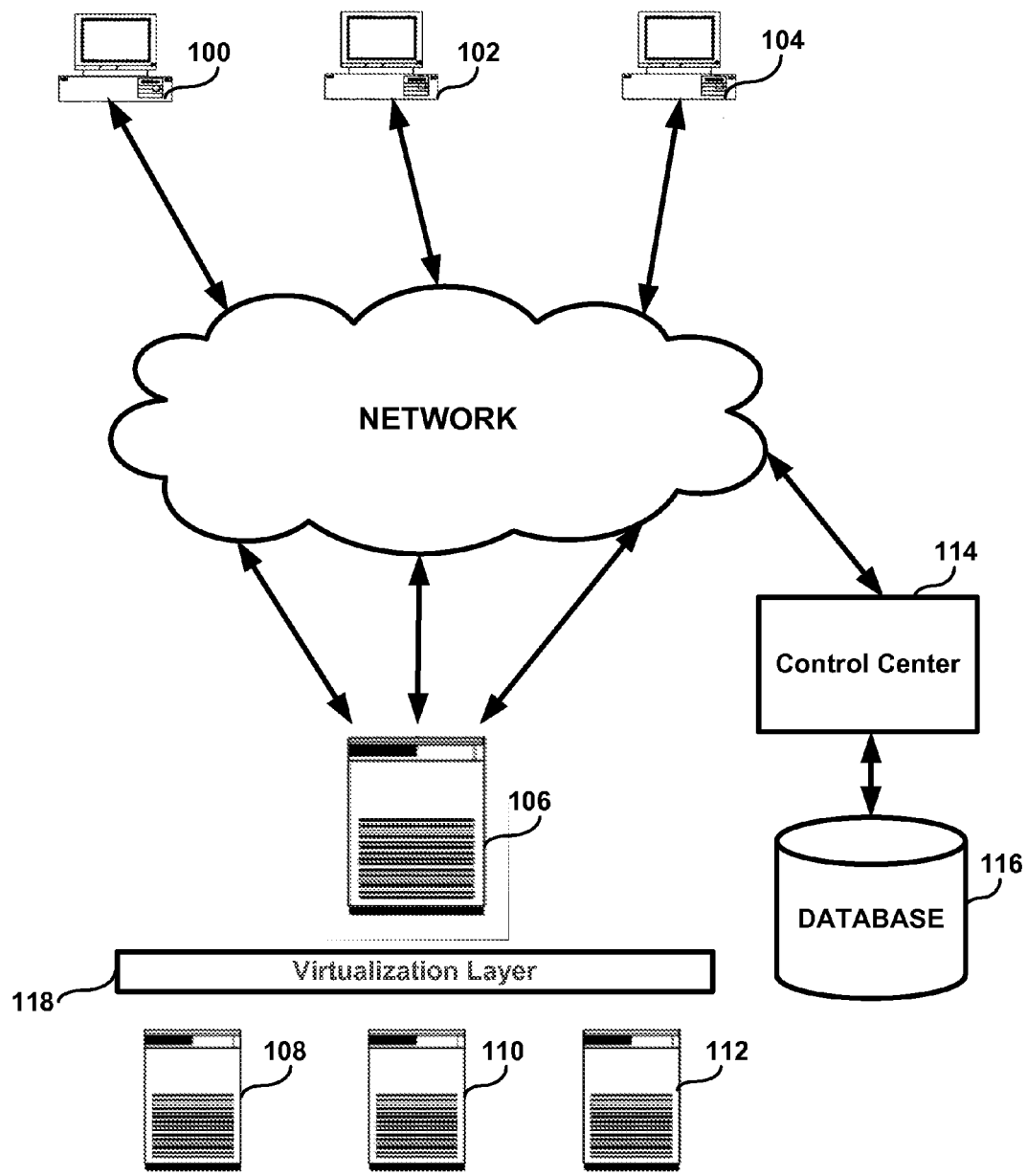
FIG. 1 illustrates a network configuration in accordance with an exemplary embodiment.

Reference will now be made in detail to the embodiments of the present invention, examples of which are illustrated in the accompanying drawings.

In the discussion herein, the following definitions are used:

VEE—Virtual Execution Environment, is a type of environment that supports program code execution, where at least a part of the real hardware and software required for running program code are presented as their virtual analogs. From the point of view or the user, that the code in VE runs as if it were running on the real computing system.

VE—Virtual Environment (often referred to as a Virtual Private Server), is one type of a VEE running on the same hardware system with a shared OS kernel and most of the system resources, where isolation of Virtual Environments is implemented on the namespace level. A VE is a closed set, or collection, of processes, system resources, users, groups of users, objects and data structures. Each VE has an ID, or some other identifier, that distinguishes it from other VEs. The VE offers to its users a service that is functionally substantially equivalent to a standalone server with remote access. From the perspective of an administrator of the VE, the VE should preferably act the same as a dedicated computer at a data center.

For example, it is desirable for an administrator of the VE to have the same remote access to the server through the Internet, the same ability to reload the server, load system and application software, authorize VE users, establish disk space quotas of the users and user groups, support storage area networks (SANs), set up and configure network connections and webservers, etc. In other words, the full range of system management administration functions is desirable, as if the VE were a dedicated remote server, with the existence of the VE being transparent from the perspective of both the VE user and the VE administrator.

Virtual Machine (VM)—is a type of an isolated VEE running on the same physical machine concurrently with other VEEs. Each VM instance executes its own OS kernel. Support of Virtual Machines is implemented using a Virtual Machine Monitor and/or a Hypervisor. An example of a VM is a VMware Virtual Machine or a Parallels Software International, Inc. Virtual Machine.

Hypervisor—control software having the highest privilege level for administrating hardware computer resources and Virtual Machines. An example of implementation of the Hypervisor is the Xen open source project and virtualization for Windows Server "Longhorn" (Veridian), VMware™ ESX server.

The present invention relates to a system, method and computer program product for centralized management of multiple VEEs implemented on either a single physical server or multiple physical servers, or on multiple physical servers organized into a cluster. The multiple VEEs can be used as individual virtual servers, or can be aggregated into Virtual Server Farms. Different VEEs on the same physical server can be associated with different VSFs, as described in U.S. patent application Ser. No. 10/298,441, filed on Nov. 18, 2002, incorporated herein by reference in its entirety. An exemplary embodiment provides a user interface in a form of a graphical user interface (GUI) or a browser-based interface of a control panel for management of multiple physical and virtual servers of different types. The user interface, implemented in the exemplary embodiment, is intuitive and user friendly. Multiple VEEs of various types and formats are implemented on multiple physical servers. The physical servers are connected into a network. Server administration is implemented through a central (or management) console. The system includes server managers controlled from a common control center.

VEEs, as discussed herein, can be any of a Virtual Environment, a Virtual Machine, a Hypervisor-based Virtual Machine, and a Lightweight Hypervisor-based Virtual Machine, a session of Terminal Server Windows 2003 (or older) and a session of Citrix Presentation Server, Lightweight Hypervisor-based Virtual Machines, VMM-based VMs or hypervisor-based VMs. Each VEE provides a set of services to local and remote users.

A VEE, such as, for example, Virtual Machine (VM) or Virtual Environment (VE) is a type of an isolated Virtual Execution Environments that run on the same physical machine simultaneously. Each VM/VE instance executes its own applications and can share files used by other VMsNEs implemented on the same physical system.

Physical users in a Virtual Execution Environment, for example, in a VE, are usually remote users of the server. However, these users can be local users of a computer system where the VE is implemented. Each physical user has a user ID, which is associated with a set processes and permissions. Multiple physical users (both local and remote) can be simultaneously logged into a VE. Each user normally has a set of permission to perform operations with the VE. In the proposed embodiment, VE users can change some of the configuration parameters directly based on user permissions. However, only the users with administrator rights can change all VE configurations. The configuration parameters selected by a user-administrator are approved and updated by a control center.

In one embodiment, a server management center performs an operation of converting one VE or VM (or a group of VEs/VMs) into a format of another VM or VE. The conversion includes converting VEs/VMs implemented on the same platform as well as converting the VEs/VMs into a format of another physical server or into the format of VEs/VMs implemented on a different platform. The proposed system includes a database containing configuration data and data related to operation formats of physical and virtual servers. A conventional relational database can be used. Alternatively a proprietary database system with its own data engine can be employed.

The database can contain data such as, for example, a list of virtual servers, a list of physical nodes of a managed network, traffic data, configuration parameters of the individual servers (these parameters are also stored on the servers). In an alternative embodiment, the database can be distributed over a multiple physical servers of a managed network. In this case the database can be accessed concurrently by multiple administrators. The distributed relational database allows using complex update queries. Processing of these queries updates data located on different physical nodes of the network. A server manager can have a direct access to parts of the database. Configuration parameters of physical servers and VEEs implemented on these servers can be stored in parts of the database accessible to the server manager.

A Virtual Environment (VE), according to one embodiment, is an isolated server, which has its own root directory and its own set of users. A VE can have a dedicated IP address, a dedicated memory, dedicated processes, dedicated files and dedicated applications etc. Each VE also has its own system library and configuration files. According to a preferred embodiment, a central console provides effective and secure remote management and administration of a VE or a group of VEs implemented either on one or on several physical machines and/or servers. The central console collects operational statistics and controls resource allocation for all servers within a managed network.

A central console, according to the preferred embodiment, can "push" new configuration parameters to the physical and virtual servers. It can also "pull" and save the updated, by users of VE or physical server, configuration parameters. These parameters are stored in the database. The central console also monitors the VE and physical server-related events such as, for example, licenses expirations, disc quotas is reaching or has been reached critical level, corruptions of server applications, resource overloads etc. All of these events may be displayed to an administrator via the user interface of the central console.

Note also that an event can be a system failure, but also can be behavior of a server (or several servers, either virtual or real) that can potentially lead to system failure. In this case, a system administrator can be notified, for example, to take a decision regarding increasing disk space allocated to a particular server, a particular user, etc, in order to ensure orderly increases and disk space and disk quota management. As one example, various pre-set scenarios can be used, that notify the user and/or administrator upon event occurrence, and based on the results of the scenarios.

Controlling access to the core of an operating system is an important part of controlling a physical server where VEEs are implemented, because the physical server controls a large number of VEEs and, thereby, controls many important system functions. Reliability and stability of a VEE is provided by an isolation of user applications from a core of the operating system. Thus, a shut down of the system core causes a shutdown of all the VEEs implemented on it.

Security of each VEE can be implemented separately. Since communication between a VEE and external devices is often done over the network, the applications can be protected by the conventional network means, such as inter-network screens, intrusion detectors, security scanners, etc. For example, configurations of inter-network screens are included in applications templates by default. A VEE is isolated using the following exemplary subsystems and features:

1. File system. All operations of the root catalog affect only the current process and its ancestors. The VEE system is isolated within one catalog of a Host Operating System (OS).

2. Processes. The Host OS can access a process of the VEE only with the help of special commands.

3. Network. Each VEE has its own IP address (or a group of addresses) that is assigned to all processes executed within the VEE.

4. The means of interaction between processors are also limited to a particular VEE.

5. Super-user privileges. The root user in the VEE has special rights required by the security of the Host system.

6. Additional means for protection of a Guest OS.

Each VEE has its own configuration files for the entire system, as well as for particular applications. The migration process from one physical server to another physical server can be implemented for different types of VEEs. Also, conversion of a physical server into a VEE, can be implemented for multiple VMs as well as for multiple VEs. Different types of VEEs can be deployed on the same physical server. Therefore, migration and conversion processes affect only the group of processes of a Host OS that are connected with a particular VEE.

Each VEE can have its own versions of system libraries or it can change the existing libraries. A VEE user can add, modify and delete files, including the files in the root directory. The user can also install user applications and reconfigure and/or change the root user applications. The security means of a VEE can be the same security means as those of a standard OS such as, for example, Linux or Microsoft Windows. The VEE security system can have filters, watchdog timers and port monitoring for suspicious activity.

An important task accomplished by the preferred embodiment is migration of applications from a central server to different physical machines. When a selected application needs to be migrated from a VEE running on one physical server into a VEE running on a different physical machine, application templates are used. The application templates are references to a "master" copy i.e., a copy of an application that was originally installed. The applications are provided "by reference" and not "by value." In other words, only the links to the application's code modules located in a system registry are used and the actual applications are not stored on a disk. That allows saving the disk space and memory resources, because of frequently repeated requests to a system registry (i.e., copying its base parts).

An application template includes all files installed on the system. For migration, the same version of the application template of an OS has to be installed on both of the machines prior to copying all of the references from the template onto a target machine. The process takes a relatively short time because only the references and not the values are copied. As a result, a target VE has all the references to the files of the template. When an application is migrated, the part of the registry is copied with its configurations. In case of multiple VEs implemented on one physical machine the file extensions of an application are used and configuration templates are imported.

Yet another critical task accomplished by the preferred embodiment is creation of multiple copies (i.e., cloning) of the VEs. The groups of VEs with hundreds of applications are migrated not by copying of data, but by changing VE identifiers and implementing the VE on a new physical machine without resetting all of the configuration parameters.

The central console, according to the preferred embodiment, performs general administration tasks and advantageously provides remote control over a large number of VEs implemented on multiple physical servers. The central console allows monitoring installations and updates of VEs, it also keeps track of versions of operating systems executed on different VEs implemented on multiple nodes (i.e., physical servers or VMs). The central console also allows updating master Operating System (OS) templates as well as master application templates. Thus, applications can be updated on all of the network nodes simultaneously.

The proposed central console can create, activate, deactivate and delete any number of VEs. It can also perform real time monitoring remotely and simultaneously migrate any number of VEs to other physical servers. Additionally, the central console can invoke server events by employing control objects. The central console can also monitor the server events and report them to a user via the central console user interface. If the server events cause changes in the configuration parameters, a notification is generated and sent to the central console, then these parameters are acquired by the central console and stored in the database.

In one embodiment, migration of VE or groups of VEs to another physical server or a group of physical servers is provided. Virtual servers may need to be migrated when a commercial enterprise is moved to a new location, such as, for example, a new office or an additional new office is open. In these situations it is critical to maintain the same connections between the VEs and their functionality. First, a network of new physical servers is created and then the VEs are implemented on the physical servers of the network. In order to implement the VEs on the new physical servers the appropriate software has to be installed on the physical servers. For example, a list of drivers and original templates of applications used on the physical servers, from where the virtual servers are migrated, needs to be determined and implemented on the new physical servers.

The old drivers can be replaced by new ones according to hardware components installed on the new physical servers. A special file containing the configuration parameters of the migrated VEs is created. A migration utility is executed on each VE for preparing a VE for migration. The migration of a VE or a group of VEs is performed according to a migration plan. According to the migration plan, access lists of all users are updated for all VEs.

The main task of utility responsible for implementation of the migration plan is to analyze system configuration and to plan migration according to the system configuration. Migration utility also determines the applications that need to be migrated and configurations of hardware components that need to be renewed upon migration on a new physical server. After these steps are performed, an image of an operating system is created and, using this image, the applications and the system configuration parameters can be transferred to a new physical server over a network connection.

Reserve copies (e.g., snapshots or backups) of the VEs being migrated are created. The snapshots of the virtual servers are generated and all of the VEs being migrated can be shut down at this point. Then the applications and the configuration data of the physical servers are transferred to new physical servers. The snapshots of the VEs are also transferred and the physical servers are started. Additional drivers are installed and the physical servers are configured according to images of the operating systems. Then the VEs can be activated on the new physical servers.

In another embodiment, a method for migration of a VM implemented on one physical server to another VM implemented on another physical server is provided. For VM migration both physical servers have to run either the same OS version or OS versions that are compatible. In order to keep service interruption during migration to a minimum, only information reflecting state of processes of the VM is saved. Contents of other areas of memory are migrated incrementally, after calls to a respective area of memory are made from the migrated VM. Generally VM migration is performed in two steps:

(1) partial transfer of local data is performed prior to initiation of processes and services on a new VM. If some local data is not available, it can be ignored at this point.

(2) after shutdown of the processes on the first VM and initiation of the process on another VM, the rest of the data is transferred, and, in some instances, the previously transferred data is updated.

These operations can be implemented in an on-line mode using conventional technologies such as, for example, SWsoft Virtuozzo™ or VMware Vmotion.

In yet another embodiment, a method for reserve copying (i.e., backup) of a VE and restoration of the VE based on the backup copy is provided. A current state of the VE can be recorded even if the VE is not running. According to the proposed method, a user can select a type of copying to be used—an incremental backup or a full backup. The incremental backup includes only files and configuration parameters that have been changed since the latest backup. When a backup of either type is created, a host name of a VE is determined and also recorded. If the VE is restored from this backup copy, than the host name is restored and replaces current host name. The same is true for VE network ID(s). The network ID or IDs are saved in the backup and are restored and replace current network IDs. A control panel automatically backs up data onto separate hard disk of the physical machine.

In the preferred embodiment, VEs are created using templates of applications and templates of Operating Systems (OS). An OS template includes executable files, libraries, scripts, etc. necessary for loading the OS and managing it. It also has a set of separate applications and utilities. The OS template can be used for creation of a new VE. The OS template, unlike application template, cannot be implemented inside the VE, since the VE is based on the template.

The application template can be implemented inside the VE and a number of the application templates can be used on one VE. Before the new VE is created some critical parameters have to be checked. For example, in a network having a control center, availability of the network server where the VE can be implemented needs to be verified. If the network server is not available, the server can be configured or restored locally by administrative means.

A VE functions as if it were a separate physical server and is identified by a server network ID assigned at creation of the VE. The VE resources are allocated according to the VE network ID. The VE ID has to be unique for the physical server or for a group of servers under central control. However, different physical servers can have VEs with identical IDs because administration is performed locally. An IP address of a particular VE can be used as a network ID, since network access to the VE is performed using its IP address.

Prior to creation of a VE, it needs to be verified that at least one IP address is available for each VE and the IP addresses available belong to the same network as a physical server or a network access to the VE is set via the physical server.

Another embodiment is dedicated to a method for controlling resource allocation for a VE or a group of VEs. One of the critical VE resources is a virtual disk quota. Files located on a VE take up a certain amount of a disk space. Each VE user has a certain amount of a disk space allocated to him. A virtual disk quota prevents occupation of an excessive amount of the disk space, which has to be divided between web content, databases and mail, depending on a VE user needs. The disc quotas are monitored by the central console and incidents of the quota being exceeded are reported to the administrator via the central console user interface. Then the administrator can take an appropriate action and either to increase the disc quota or keep it at the same level. As another option, a script may be started or another unattended application may be started, for resolving the problem, e.g., to update system parameters to remove bottleneck and then the user or administrator may be notified if the problem has arisen and was resolved.

Means for resource allocation control the number of resources available for a particular VE. This mainly concerns operational memory and different objects of the system core. Resource allocation guarantees a quality of service and effectively divides available resources of the system core.

A number of parameters are used in resource allocation:

Parameter 1 is a number of processes dedicated to one user. This parameter determines a number of processes and threads of each user. As soon as VE reaches the limit of parameter 1, initiation of another process or thread will be impossible. In other words, if a user initiates too many processes, than the OS can be busy just trying to service these processes and other user processes will get service rejections. In order to avoid this situation, a special limiting gauge, that prohibits initiation of too many processes within each VE, is implemented.

Parameter 2 is a memory of the OS core. A situation is possible when the OS core is busy serving particular data structures and does not have any memory available for creation of a new structure. Thus, these service operations have to be limited for each physical machine by a control center.

Parameter 3 is Central Processing Unit (CPU) time. In order to guarantee CPU time, a group planning of processes needs to be implemented. In other words, the processes within each VE are managed in such a way that a minimal amount of CPU time is always available even during maximum system load. Otherwise, any actively executed process can take a very large part of CPU time and create a service rejection situation for user processes.

Parameter 4 is a disk quota. The disc quota makes impossible for each VE to take up a large portion of a disk space. The disk quota, according to the preferred embodiment, can be temporarily increased. A user can increase his disk quota after he exceeds the "soft" (flexible) quota. It is also possible to set up individual as well as group quotas for disk space using special functions for resource allocation on each VE. For example, a simultaneous increase of limits of processor use and disk memory can be implemented for groups of VEs.

The implementation of the "soft quota" performed as following: if a user has exceeded his quota, he can use an extra quota without any limitations, as long as extra resources are available on the system. However, as soon as this resource is requested by another user, it is taken away. The "soft quotas" are applicable to resources such as processor time, amount of physical memory allocated for user application, network bandwidth, etc. The "soft quota" cannot be applied to resources controlled in a "hard" (inflexible) manner such as, for example, a number of processors, a number of sockets, etc.

In the proposed method, only the disk space that is actually occupied is taken into consideration instead of aggregated quotas of all of the resources. According to the exemplary embodiment, the flexible disk quota is used. This allows a VE administrator to make a decision when the disk quota is reached. A VE administrator can, for example, decide to increase the disk quota or to clean up the virtual disk. In particular, a VE administrator can scan all the data on the virtual disk and clean up the disk by deleting redundant data that is common for different users. The data access for the remaining sharable data has to be reconfigured for all users.

The proposed control console allows modification of all configuration parameters of an individual VE such as, for example, Virtuozzo™. The control console also provides a flexible system of recording changes and events. As discussed above, the disk quota allocated for a VE can be changed. Other parameters, such as VE operation priorities, capacity of a communication channel, IP address, etc. can also be modified. A web panel of the embodiment displays a web user interface that allows recording all of the events performed with a single VE. A particular event or a number of events can be marked to be monitored. All of the records are placed in a special report that can be viewed in a real time. The events, such as creation, start and shut down of a VE are recorded by default. However, the system can be set up that all of the events associated with a VE are monitored and recorded.

The proposed method provides a graphic panel consisting of multiple user interfaces. The user interfaces of an exemplary embodiment can be GUI-type interfaces or browser-based interfaces. The graphic control panel provides local and remote access to multiple servers. The graphic control panel, according to the preferred embodiment, serves as a convenient mechanism for communication between user-administrator and a database containing configuration parameters for multiple servers of various types and formats. The graphic control panel provides concurrent system access to multiple users-administrators, who can simultaneously query the database. These processes are supported by efficient functionality of a control center.

The user interfaces of the graphic control panel present list of available operations and objects. The objects represent physical servers and virtual environments (i.e., VEs and VMs). Thus, the graphic control panel allows performing operations with servers of different type. In order for a user-administrator to receive access to configuration parameters of a server or a group of servers, he has to get registered through a special user interface that can accept data in a form of symbol or textual information. The user interface of a local control panel presents the physical servers with the VEs implemented on them in a form of a tree structure that is convenient and intuitive for users-administrators. Thus, a user-administrator can easily access and monitor the entire group of servers through the user interface. However, users-administrators have different levels of access to the servers. Options available for each operation to be performed by a particular user-administrator are also determined by the access level assigned to this user-administrator.

The user interfaces of the graphic control panel presents objects available not only for simple operations, but for group operations as well. The group operations require graphic presentation of multiple objects available for these operations and graphic rendering of results of these operations. The parameters of execution of the group operations can be changed. A special user interface window provides user-administrator with an ability to change operation parameters through an intuitive context menu.

Another graphic panel user interface is available for monitoring resource allocation of a physical server or a VE. This user interface presents in real time a graphic information reflecting changes of the parameters selected by a user-administrator. The information is displayed in a form of a graph or a histogram, which uses different colors for different parameters, making it easy to monitor multiple parameters in real time.

When changes are needed to be implemented, the system performs a group operation with multiple servers in accordance to configuration parameters that have been changed. These changes are implemented by a control center and, therefore, involve changes of the configuration parameters data in a central database. The graphic control panel dynamically checks compatibility of the configuration parameters of servers or groups of servers. The control panel verifies that a particular user-administrator has a right to change certain configuration parameters for particular servers. Thus, when a user-administrator inputs incorrect values of the parameters or inputs the configuration parameters that are not compatible, the properties of a user interface window change accordingly. Alternatively, an operation of changing configuration parameters can be scheduled by administrator and performed automatically. The scheduled operations can affect one server or a group of servers.

When a monotype group operation is implemented, the combinations of objects can be created. These combinations can include VE and VM, VE and VE, VM and physical server, and VE and physical server. An example of a monotype operation is conversion. Conversion operation means that an entire group of VEEs, such as, for example, VEs with numerous applications implemented on them are moved to new hardware. Note that conversion operation does not copy data, but instead implements the VEs on new hardware.

An exemplary computer network that can be used in the preferred embodiment is illustrated in FIG. 1. Physical servers 100, 102, 104 and 106 are connected into a network. A physical server 106 has a virtualization layer 118 where VEEs (i.e., VEs) 108, 110 and 112 are implemented. The network is managed by a control center 114, which has access to configuration parameters of physical servers 100, 102, 104, 106 and VEs 108, 110 and 112. The configuration parameters are stored in a database 116. The database 116 can be simultaneously accessed by multiple user-administrators. Parts of the database 116 can be implemented on (or distributed over) any of physical servers 100, 102, 104 and 106 or on VEs 108, 110 and 112. The control center 114 can perform load balancing by migrating a VE or a group of VEs 108, 110 and 112 from server 106 to one of the servers 100, 102, 104 when the server 106 is overloaded.

Figure 2:
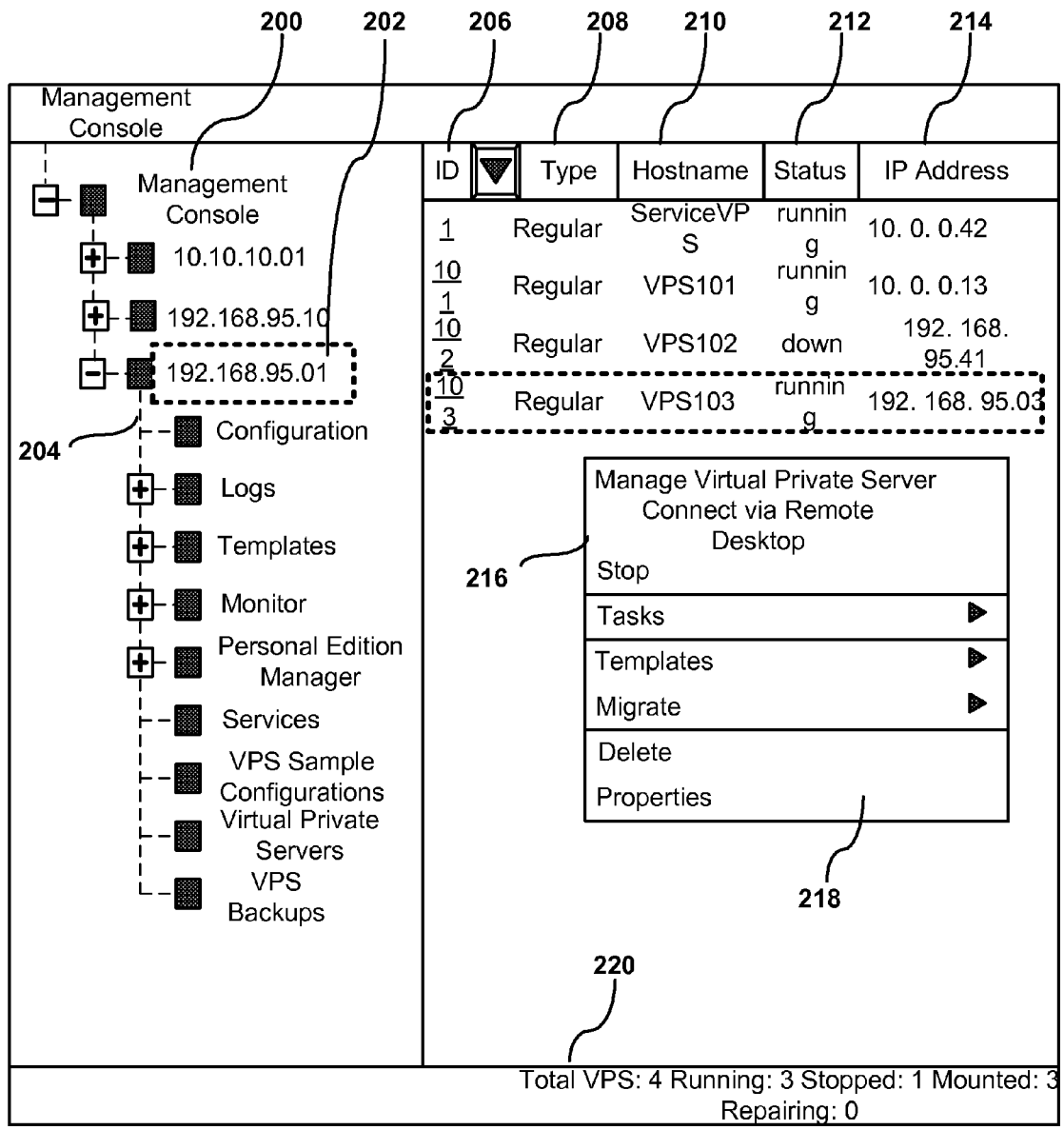
FIG. 2 illustrates a user interface of a main control panel in accordance with an exemplary embodiment.

An example of a user interface of a management console is illustrated in FIG. 2. A left panel of the user interface displays management console 200 with all available physical servers combined into a tree structure. A right panel of user interface displays a list of VEs implemented on a selected physical server 202. The exemplary parameters of VEs are listed on the right panel: type 208, hostname 210, status 212 and IP address 214. Each VE has an ID 206, which has a reference in a database 116. The VEs can be selected by clicking on them or by activating a user interface check box control. The VEs that are not available for a particular operation are made inactive on the user interface. A user interface window 216 is used for managing selected VEs. Menu 218 is shown when a VE is selected. Operations displayed in a tree 204 of a management console are available for a selected physical server. Current statistics of all VEs of a selected physical server are shown in panel 220.

FIG. 3 illustrates a user interface of a management console used for migration of VEs. Available physical servers, where VEs can be migrated to, are displayed in panel 302. Check boxes 304 allow user-administrator to select parameters of migration.

Figure 4:
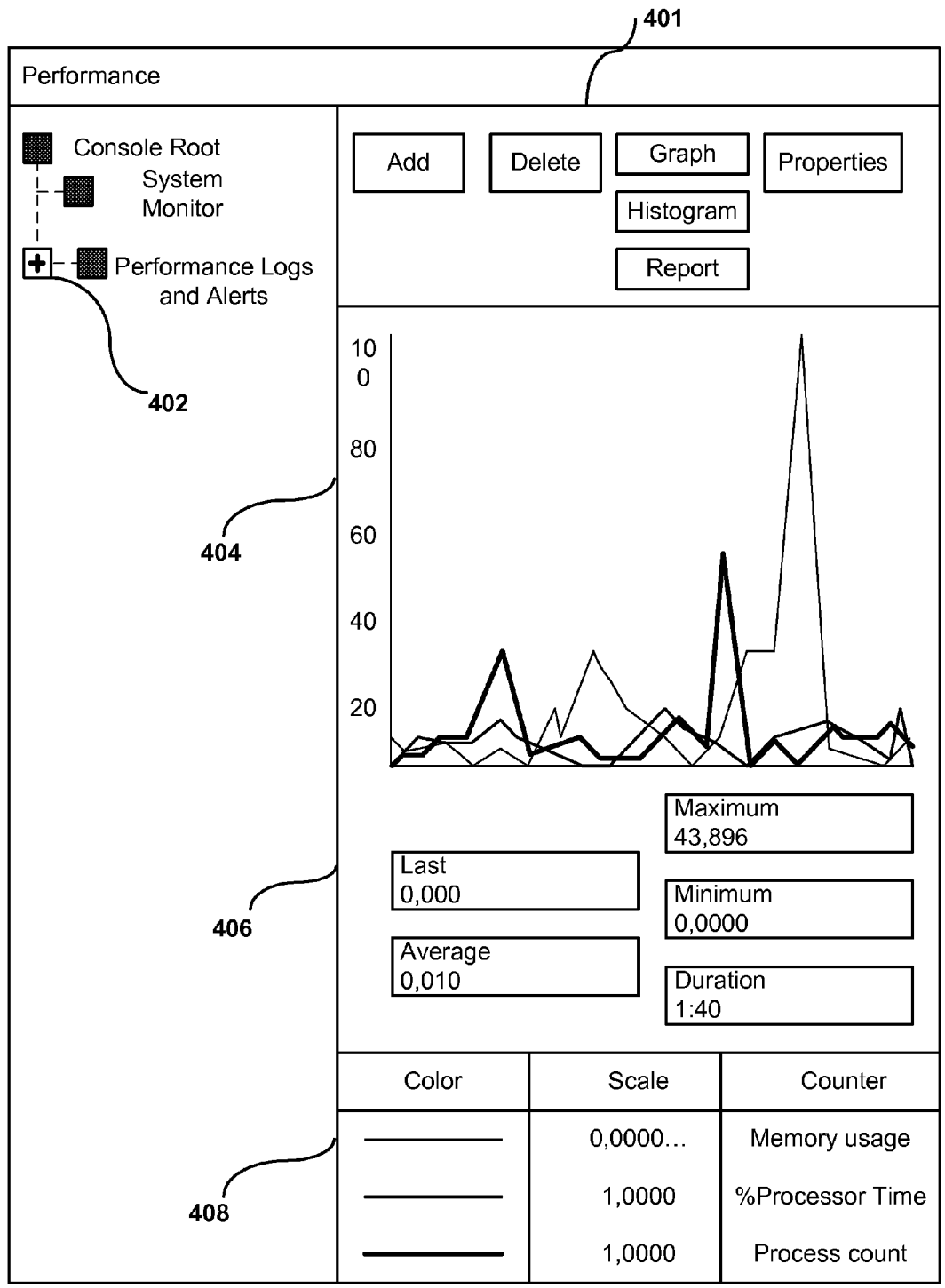
FIG. 4 illustrates a user interface of resource usage control panel in accordance with an exemplary embodiment.

FIG. 4 illustrates a user interface of a management console used for system monitoring. Left panel displays tree structure reflecting services 402 available for monitoring. Right panel displays graph 404 showing changes of selected resources of a particular VE in real time. Using buttons 401 VE resources being monitored can be added or deleted. When button "Add" is clicked a menu with all resources is presented to a user-administrator.

User-administrators can also choose a form of presentation of information, for example, by clicking on a particular button of panel 401, a user-administrator can see a report, a graph or a histogram reflecting changes of a selected VE resource in real time. Information for each resource is displayed in a different color. Maximum and minimum values for each resource are calculated and displayed in user interface labels of panel 406. These labels also display last, average and duration values. Table 408 displays color, scale and counter for selected resources of the monitored VE. User-administrator can change all of the parameters at once by clicking on button "Properties" of panel 401. An interactive menu is then presented to the user-administrator, so he can change selected parameters for the VE.

Figure 5:
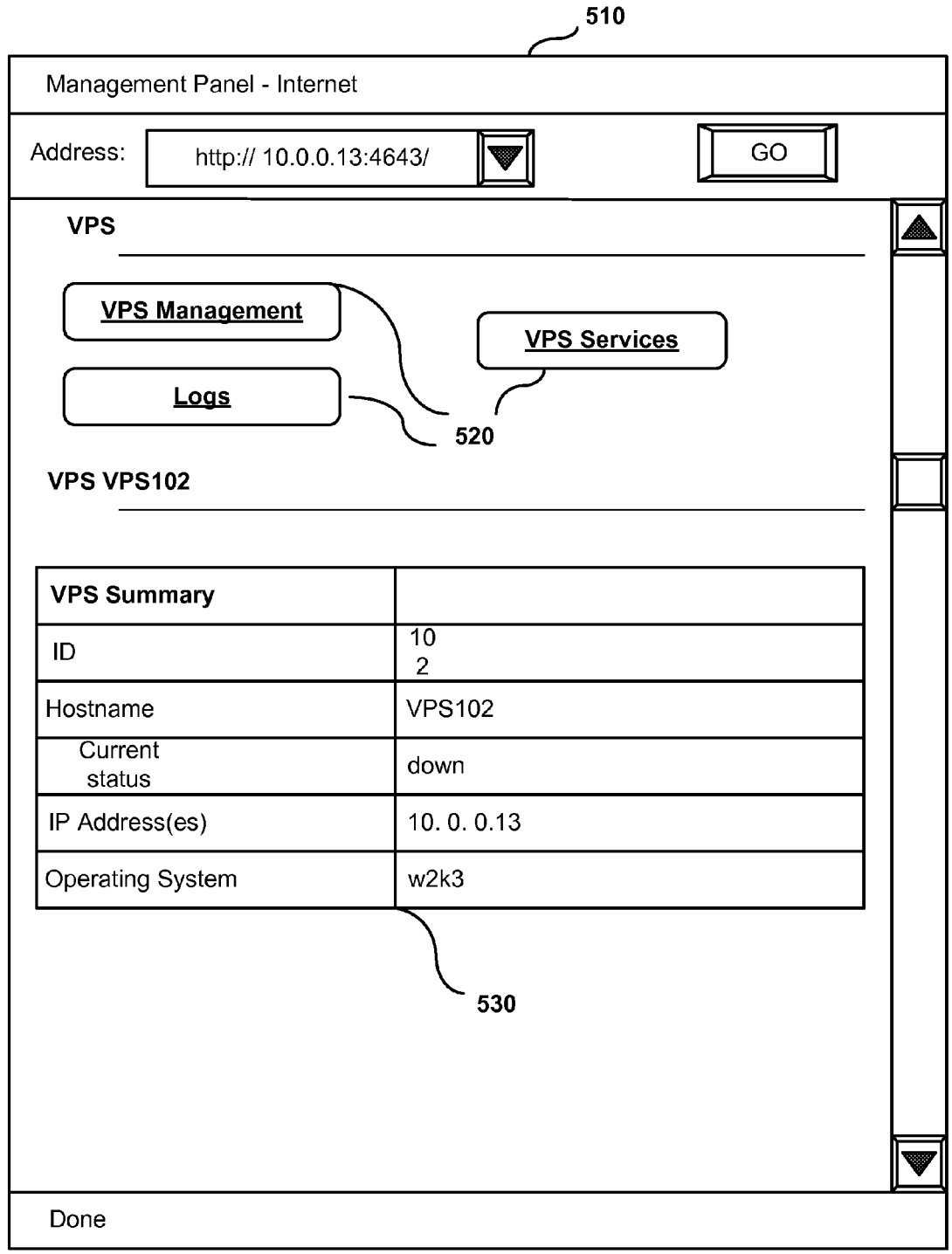
FIG. 5 illustrates a user interface of a control panel for aggregated properties for individual VEEs in accordance with an exemplary embodiment.

FIG. 5 illustrates a user interface 510 of a management console that can be used by a server manager for performing operations with the individual VE. Buttons 520 represent operations that are grouped according to type of operation. When a user-administrator clicks on each button 520, an active menu list displaying operations available is activated. One group of operations, for example, is available under the "VE Management" button. These operations perform VE management, configuration and monitoring. If the user-administrator needs to perform reserve copying (i.e. backup of a VE) and then restore the VE at another time or at a different location, the operations from the "VE Management" group need to be employed. The most common operations available to user through the user interface 510 are starting and shutting down a server, file management operations, resource monitoring, changing administrator's password, saving integrity and functionality of the VE, etc. Table 530 displays aggregated parameters for a selected VE.

Figure 6:
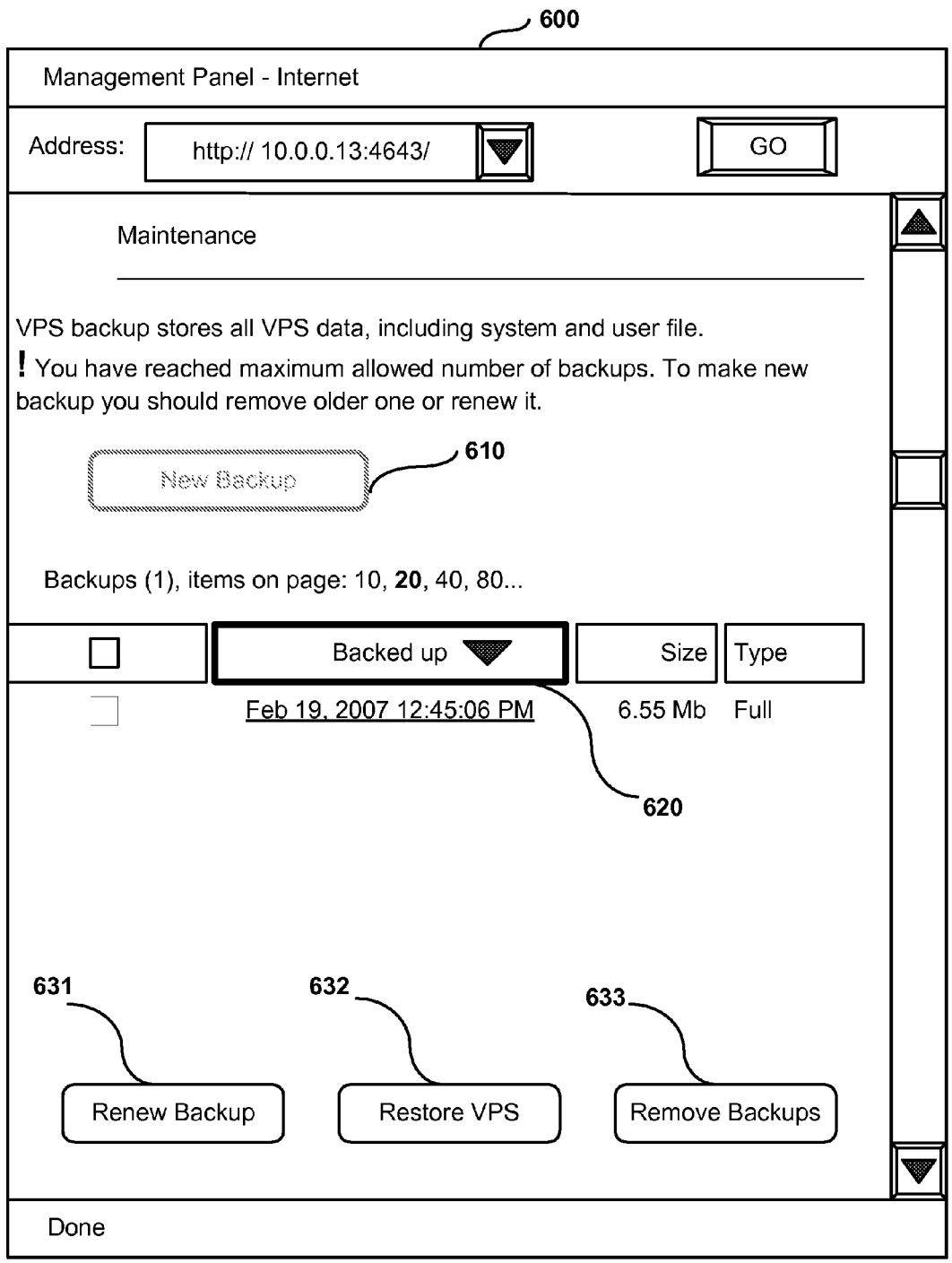
FIG. 6 illustrates a user interface of a control panel for copying and recovering VEEs in accordance with an exemplary embodiment.

FIG. 6 illustrates a user interface 600 of a management console used for backup and restore of a selected VE. The user interface 600 presents a special warning message to a user when maximum allowed number of backups is reached. In this case button 610 becomes inactive. If the limit of backups is not reached the use can click on button 610 and create another backup of a VE. The backups already created are shown in a check box menu 620. By clicking a button 632, the user can restore the VE according to a selected (from menu 620) backup version. The selected backup version can also be renewed by clicking on a button 631 or it can be removed by clicking on a button 633.

Figure 7:
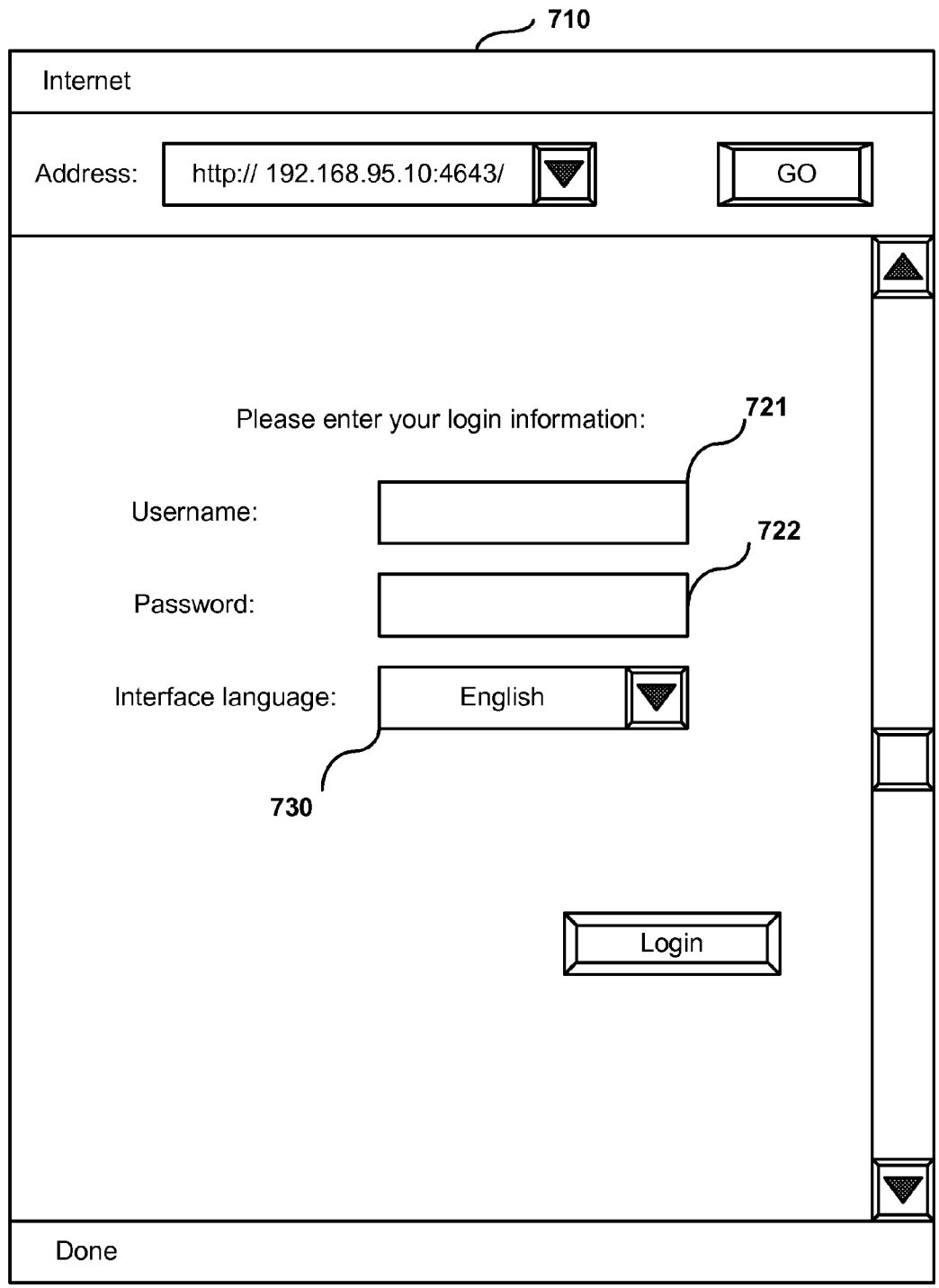
FIG. 7 illustrates a user interface for user registration at control center in accordance with an exemplary embodiment.

FIG. 7 illustrates a user interface 710 of a management console used for user-administrator registration. User name and password text boxes 721 and 722 are used. Access to the system is protected and parts of a database contain user authentication data. Authentication can be performed, for example, using Remote Authentication Dial-In User Services (RADIUS). RADIUS servers have access to various archives and backups, such as, for example, Active Directory, where user authentication information is kept. User can also select a language of a user interface by using fold-down menu 730. When a user is authenticated and logged in, he becomes a user-administrator who can perform management and administration of servers within a network.

Figure 8:
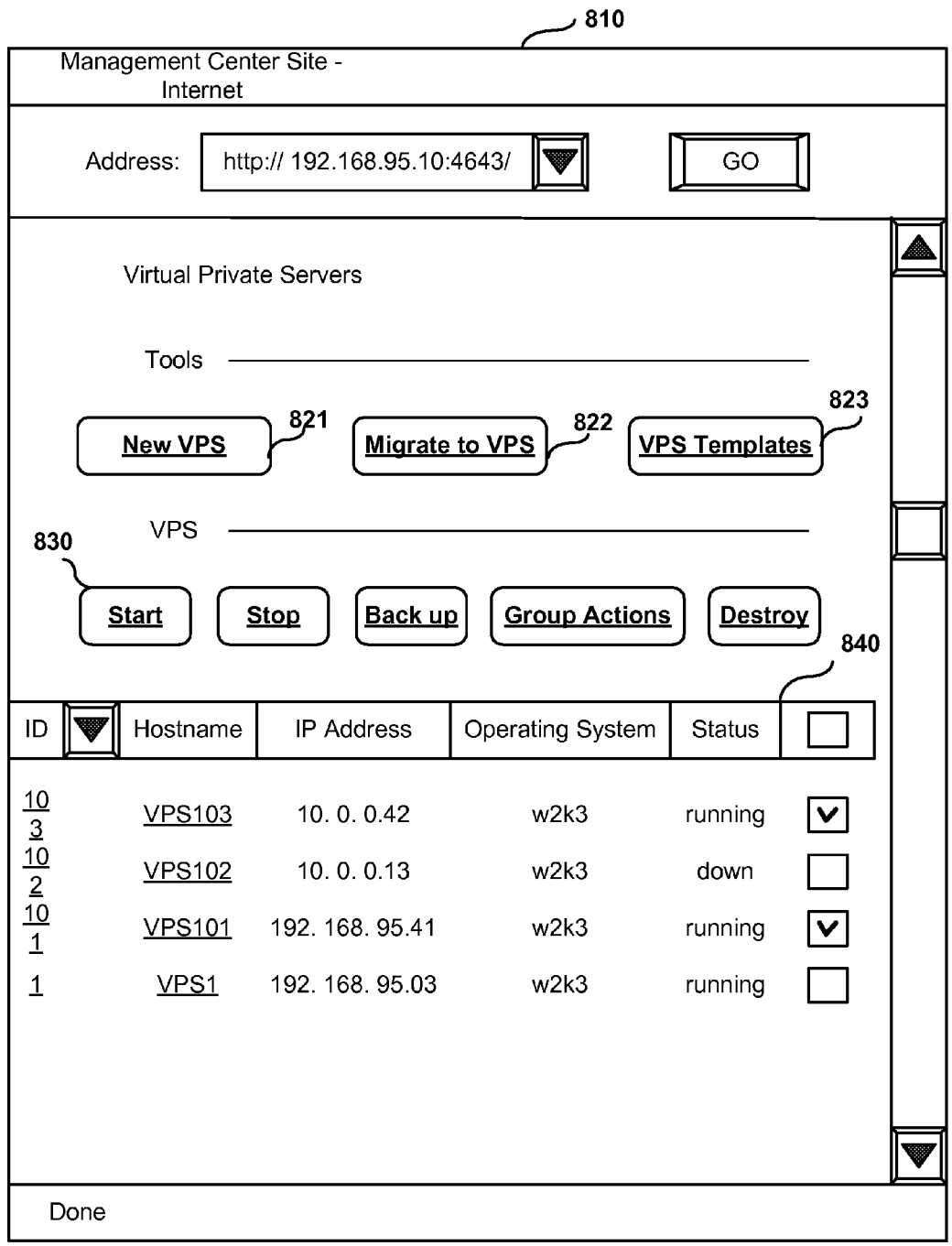
FIG. 8 illustrates a user interface of a control panel for administering VEE related operations in accordance with an exemplary embodiment.

FIG. 8 illustrates a user interface 810 of a management console used for management of a group of VEs. Buttons 821, 822 and 823 are used for activation of specials utilities (i.e., tools) for managing and administering VEs. Buttons 830 are operations available to a user-administrator. Table 840 displays VEs and their respective parameters. As discussed earlier, one of the methods for managing resources of a VE is changing disk quotas. Changing disk quotas is normally a group operation. For this operation a group of VEs is selected (by mouse click on the check box) in table 840. Then the user-administrator clicks on a button 830 "Group Action," which brings up a special user interface form with configuration data for all of the selected VEs.

This special user interface form is illustrated in FIG. 9. A user interface 910 presents to a user-administrator a table 920 containing statistics for selected group of VEs. Check box menu 930 allows the user-administrator to edit or fill in disk quota data for a VE selected from a table 920. The user-administrator can also select disk quota increments from a fold down menu 931. The disk quotas can be changed in KB, MB or GB increments. After the disk quotas are changed in menu 930 and the changes are submitted by clicking a button 942, the changes take effect. Note that changes in disk quotas take effect dynamically and VEs do not need to be reloaded. Button 941, when clicked on, returns the user-administrator to the previous user interface shown in FIG. 8. The changes can be canceled by clicking on a button 943.

Figure 10:
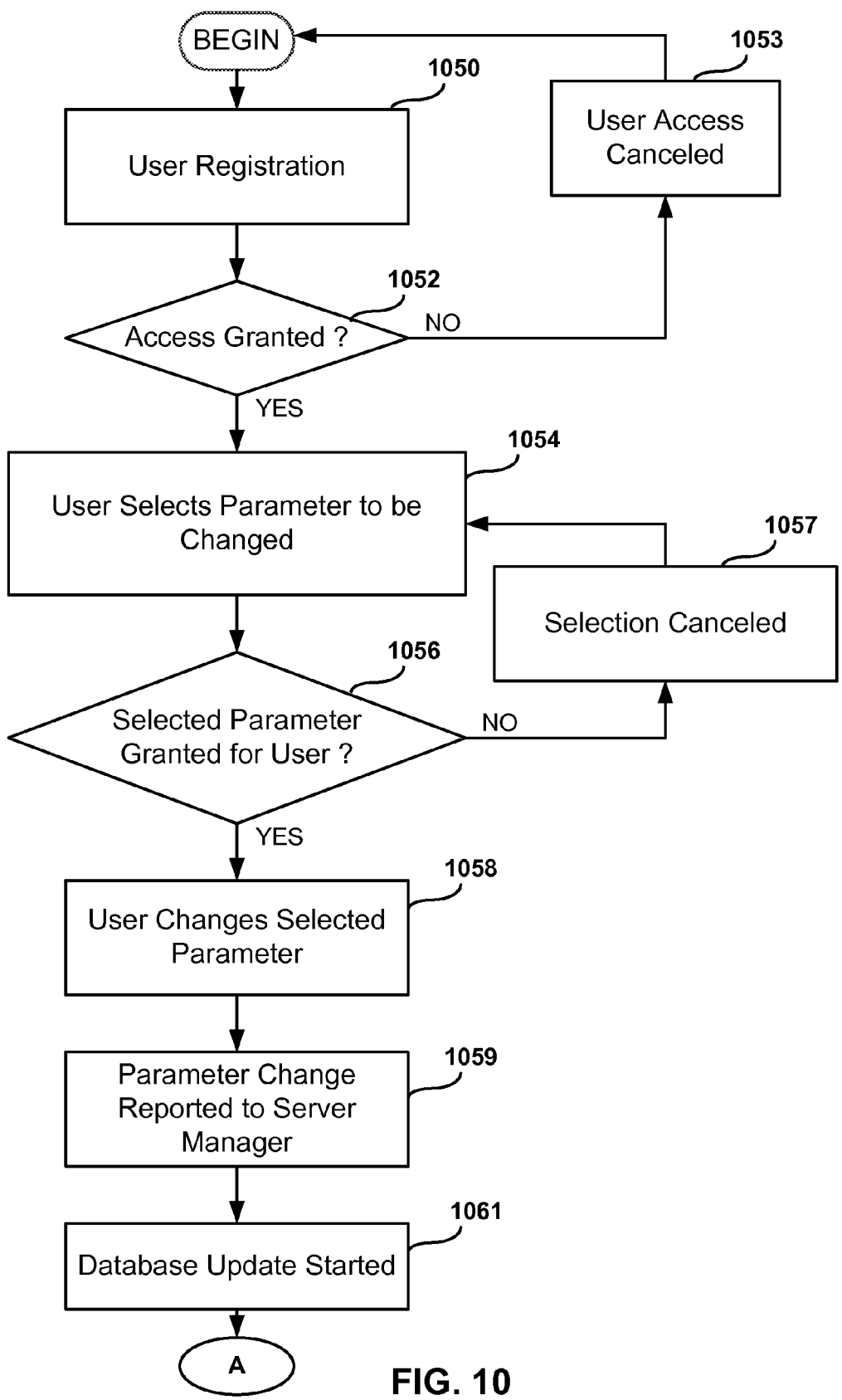
FIGS. 10 and 11 illustrate a flowchart of a process of changing server configuration in accordance with an exemplary embodiment.
Figure 11:
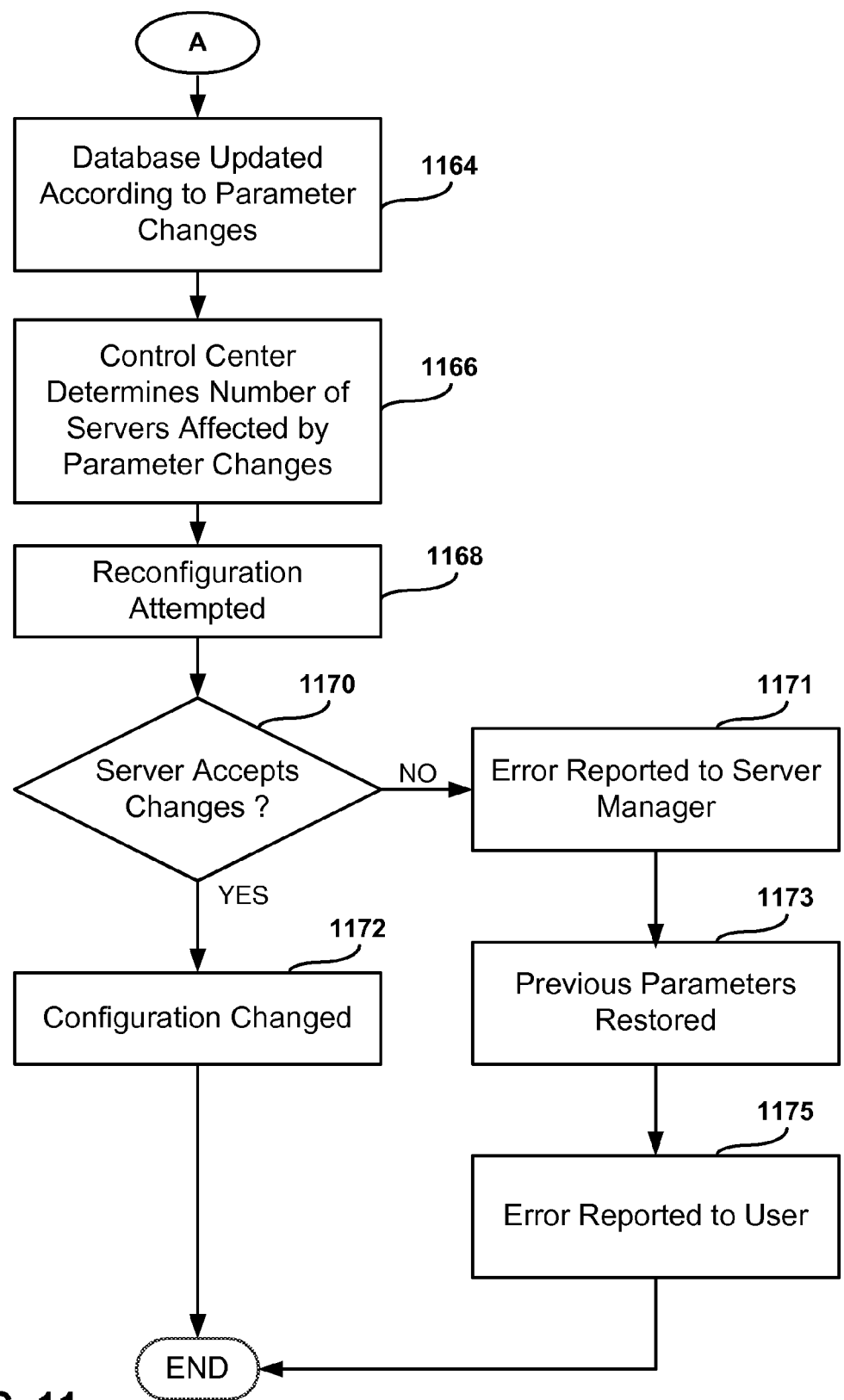

FIGS. 10 and 11, which should be viewed as a single figure, illustrate a flowchart of a process of changing server configuration in accordance with an exemplary embodiment. In FIG. 10 the process begins at block 1050 where a user-administrator registers on the network through remote management console. The user-administrator is authenticated based on his user name and password and is either granted administrative privileges in block 1052, or user's access is canceled in block 1053. The authenticated user-administrator selects configuration parameter to be changed in block 1056, where it is determined, by the control center 114, whether this particular user-administrator has a right to change a particular configuration parameter. If the user-administrator does not have the right to change the selected configuration parameter, than the selection is canceled in block 1057. The user-administrator can select another parameter in block 1056. Note that in some implementations of a proposed management system user-administrator is presented with only the configuration parameters he has the right to change.

If it is determined in block 1056 that the user-administrator has the right to change the selected parameter, the parameter is changed in block 1058. After the configuration parameter is changed in block 1058 the parameter change is reported to a server manager in block 1059. Then database update is initiated in block 1061.

In FIG. 11 the database is updated (in block 1164) taking in account the parameter changed in block 1058. The number of servers affected by the parameter change is determined by the control center 114 in block 1166. Reconfiguration of the affected servers is attempted in block 1168. At this point a server manager or an administrator of a group of servers informs the affected server or a group of servers about updates of particular configuration parameters. In one embodiment, server configuration can be updated by a resident application.

In block 1170, servers that are subject to reconfiguration determine whether they can implement instructions received from a server manager or an administrator of a group of servers. For example, if instructions are related to allocation of addition disk quota for a particular server, it has to be determined if the amount of available memory is adequate for fulfilling the instruction. If the server is not able to accept changes, than in block 1171 an error is reported to the server manager or the administrator of a group of servers. Once error message is received, the server manager restores the previous configuration parameters in block 1173. Thus, database remains in sync with server's (or servers') configuration. In block 1175 the error is reported to the user-administrator, so he is informed that requested changes can not be implemented.

If in block 1170 it is determined that the servers can implement the instructions and accept changes, then, in block 1172 the changes are implemented and the servers are reconfigured in accordance with the changed parameters. After new configuration parameters have been routed to one or more network servers and have been applied to a server or a group of servers, the database is synchronized accordingly. In cases when application of reconfiguration parameters is interrupted or failed, the server shuts down and an error message or a completion message is not received by a server manager. Thus, the database is not updated.

Figure 12:
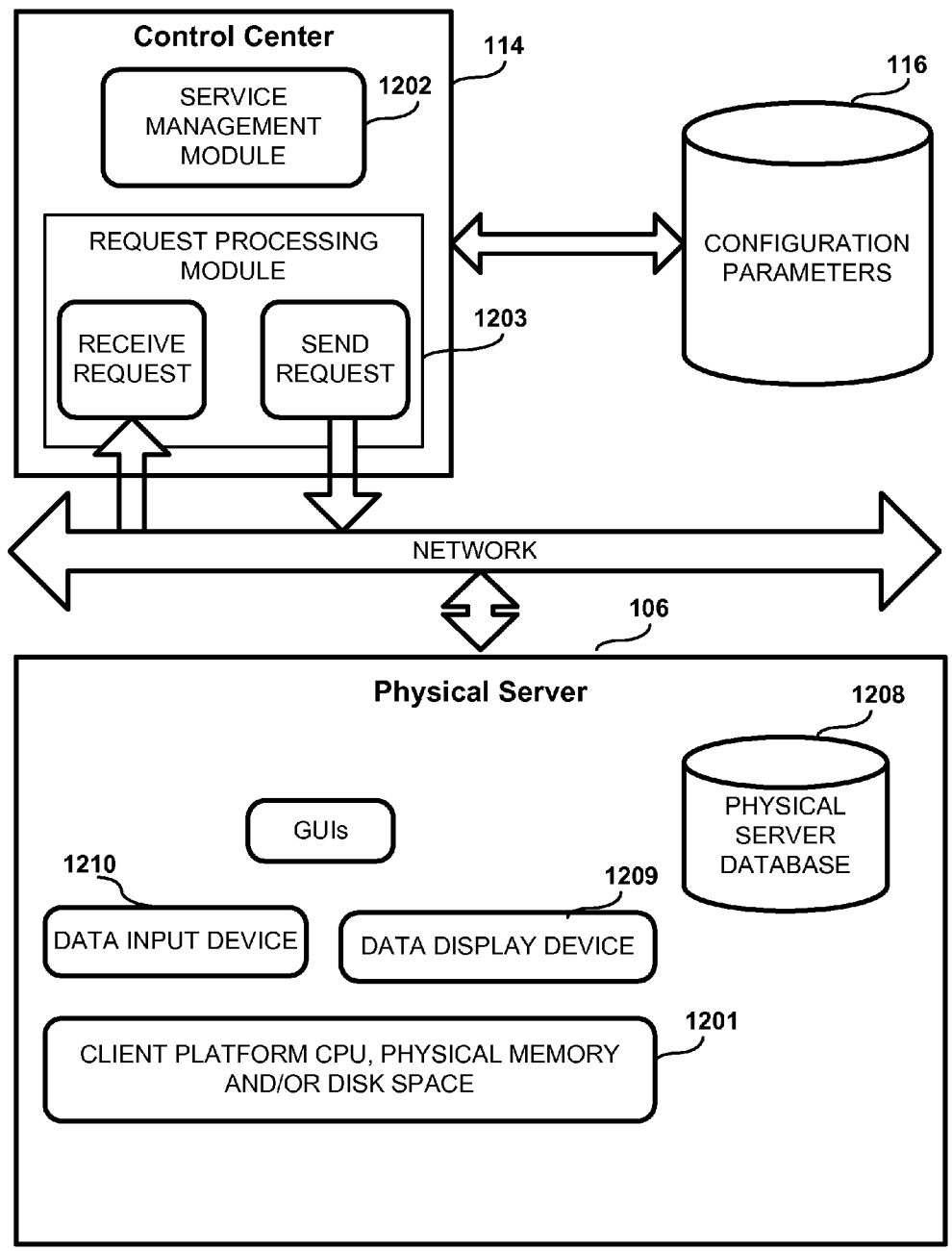
FIG. 12 illustrates general system architecture in accordance with an exemplary embodiment.

FIG. 12 illustrates system architecture of the preferred embodiment. Control center 114 has service management module 1202 that controls request processing module 1203. Control center 114 is coupled to configuration parameter database 116. Control center 114 is connected over a network to a physical server 106, which has a VE 108 implemented on it. The physical server 106 has its own database 1208, which contains some of the configuration parameters of the server 106. The physical server 106 also has I/O devices 1210 and 1209 respectively. It also has a client platform CPU 1201 with memory and disk space.

A request for configuration change from user-administrator can come either from the physical server 106, or from a VE 108. Regardless of its origin, the request for configuration change is processed through the control center 114. The user-administrator's request is always directed through the control center 114 to the database 116, where most of the configuration parameters are stored. The control center 114 processes the request using request processing module 1203, which makes a decision as where the request is directed to for final processing.

Figure 13:
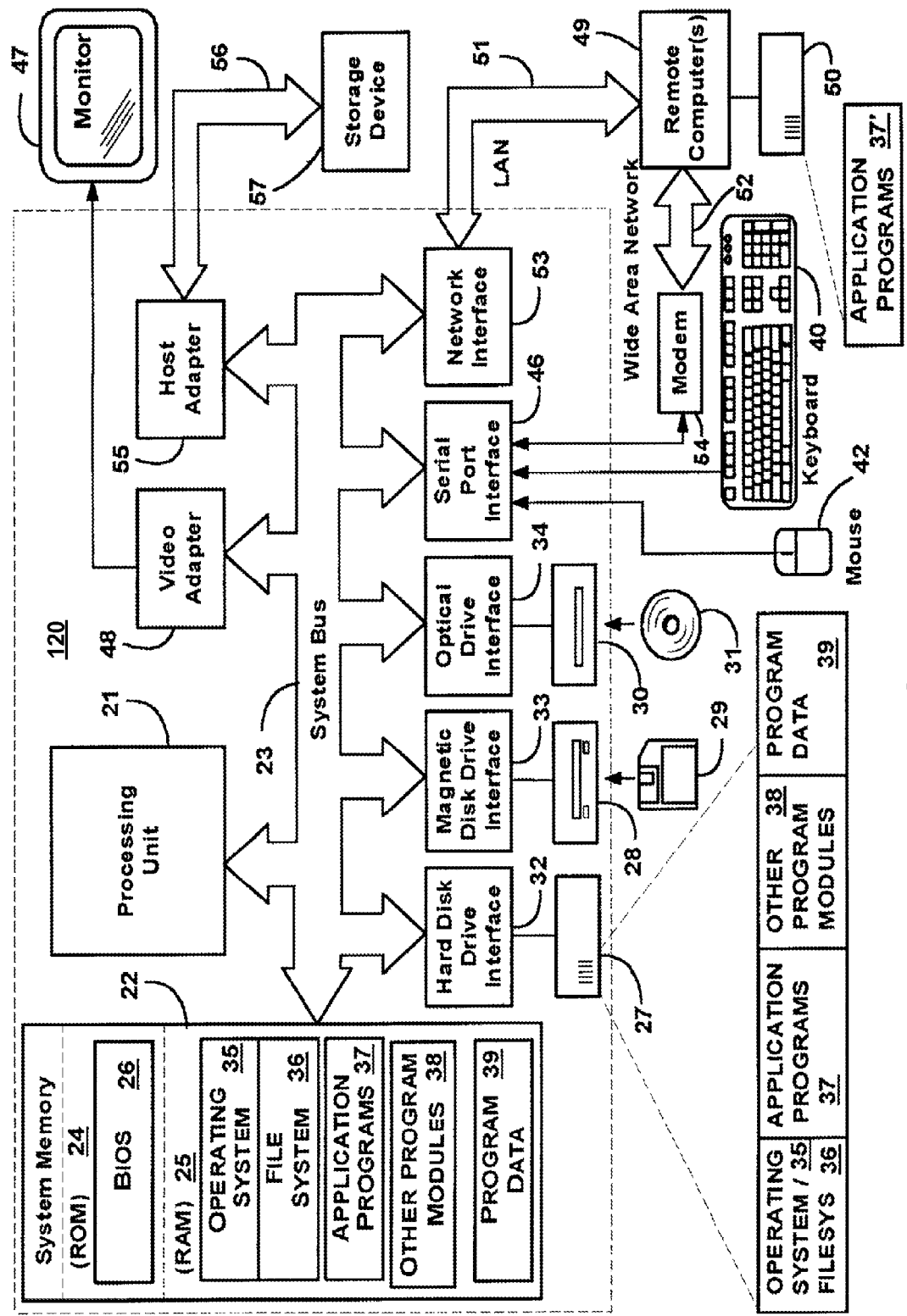
FIG. 13 illustrates an exemplary computer system on which the invention can be implemented.

With reference to FIG. 13, an exemplary computer system, where the control center 114 or the VE 108 can be implemented, includes a general purpose computing device in the form of a user-side computer and/or server-side computer 120 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read-only memory (ROM) 24 and random access memory (RAM) 25. A basic input/output system 26 (BIOS), containing the basic routines that help to transfer information between elements within the computer 120, such as during start-up, is stored in ROM 24. The computer 120 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 120. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 2000).

The computer 120 includes a file system 36 associated with or included within the operating system 35, such as the Windows NT™ File System (NTFS), one or more application programs 37, other program modules 38 and program data 39. A user may enter commands and information into the computer 100 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

When used in a LAN networking environment, the computer 120 is connected to the local network 51 through a network interface or adapter 53. When used in a WAN networking environment, the computer 120 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 120, or portions thereof, may be stored in the remote memory storage device. It will be appreciated that the network connections shown are exemplary and other means of establishing a communications link between the computers may be used.

Figure 14:
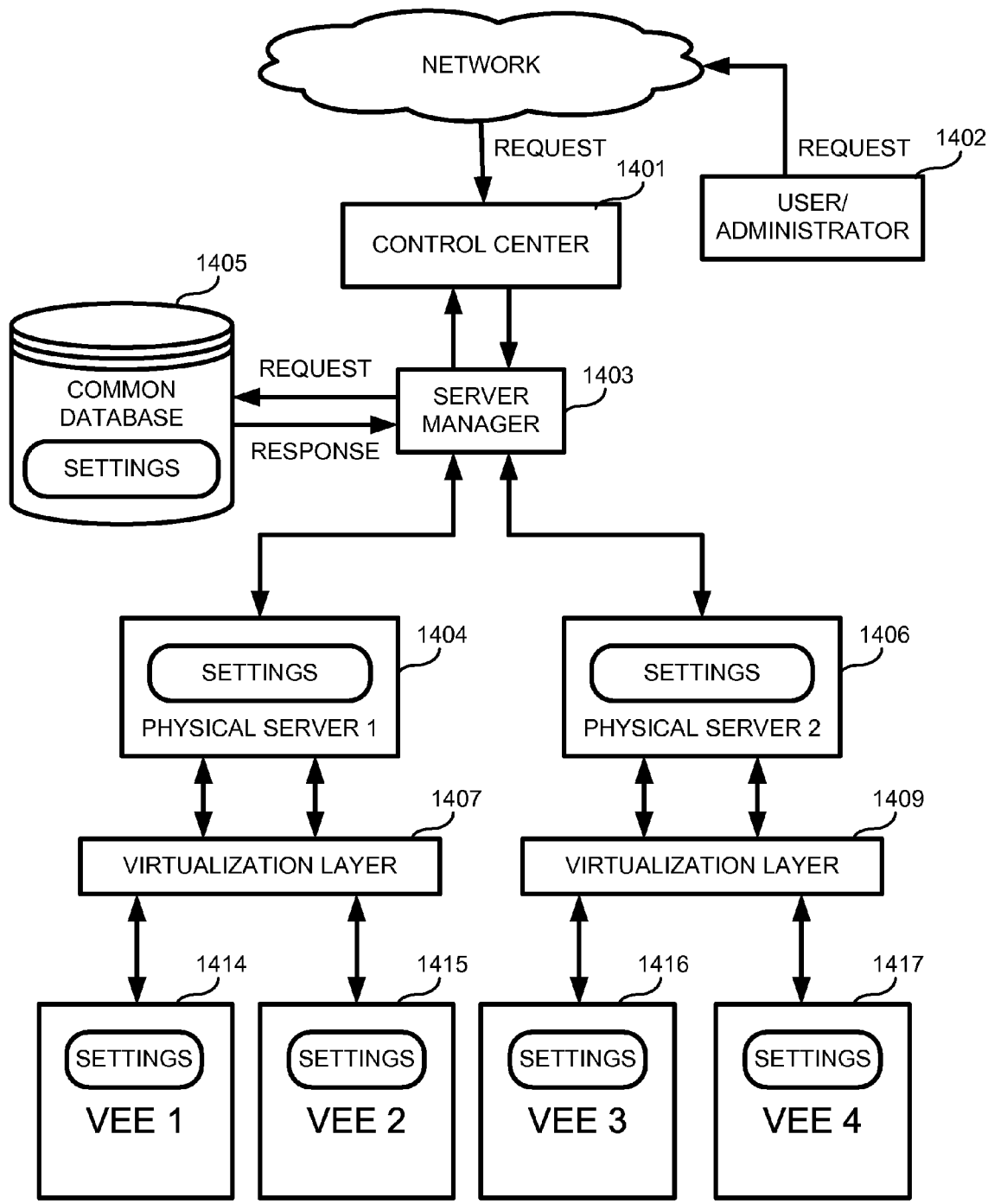
FIG. 14 illustrates system architecture including a control center and a database in accordance with an exemplary embodiment.

FIG. 14 illustrates an exemplary system including a control center 1401 and a database 1405. The control center 1401 provides I/O functionality and determines how the data is rendered (i.e., presented to a user). A request from a remote user-administrator 1402 is sent over a network to the control center 1401 that facilitates access to data stored in a database 1405. Then the control center 1401 provides the data to a user-administrator 1402. The control center 1401 allows several users-administrators to access the database 1405 concurrently.

A server manager 1403 provides data processing requested by the control center 1401. The server manager 1403 does not have a direct access to the hard disks where data from the database 1405 is stored. Instead, it uses an application utility and loads the data into an internal buffer cache, where the data is processed. If records in the database 1405 need to be updated, first the data is changed in the cache, and then a transaction for synchronizing the contents of the cache with the database 1405 is executed. Note that the cache of the database is controlled by the server manager 1403, which allocates the memory of one of the servers for creating the cache and determines a volume of memory that is needed to be cached.

According to the preferred embodiment, the data loaded from the disks can remain in the cache, until the memory needs to be made available for a new data. A cache of a large size allows reduction of a number of operations for reading data from the disk. An exemplary information system supports various types of requests. For example, a request can specify retrieving a portion of data from the cache of the database 1405 and ignoring the data from the disk, or a request can specifically ask for a portion of data directly from the disk.

Within the server manager 1403 is implemented a database management system for collection of data from the local buffers of subsystems of the physical servers 1404 and 1406 or from VEEs 1414, 1415, 1416 and 1417 of the respective virtualization layers 1407 and 1409. The virtualization layers 1407 and 1409 can be implemented with a proprietary file system as in SWsoft, Inc.'s Virtuozzo™ Virtual Environments or as in VMware Virtual Machine or with a Hypervisor as in Parallels Software International, Inc.'s Virtual machine. The collected data is stored on a hard disk in the global storage of the common database 1405. When the data is written into the global backup, each record is accompanied by the information about the source server. It allows reflecting a full map of the processes taking place on a particular server. In one embodiment, the system depicted in FIG. 14 can be implemented as a client-server configuration.

Figure 15:
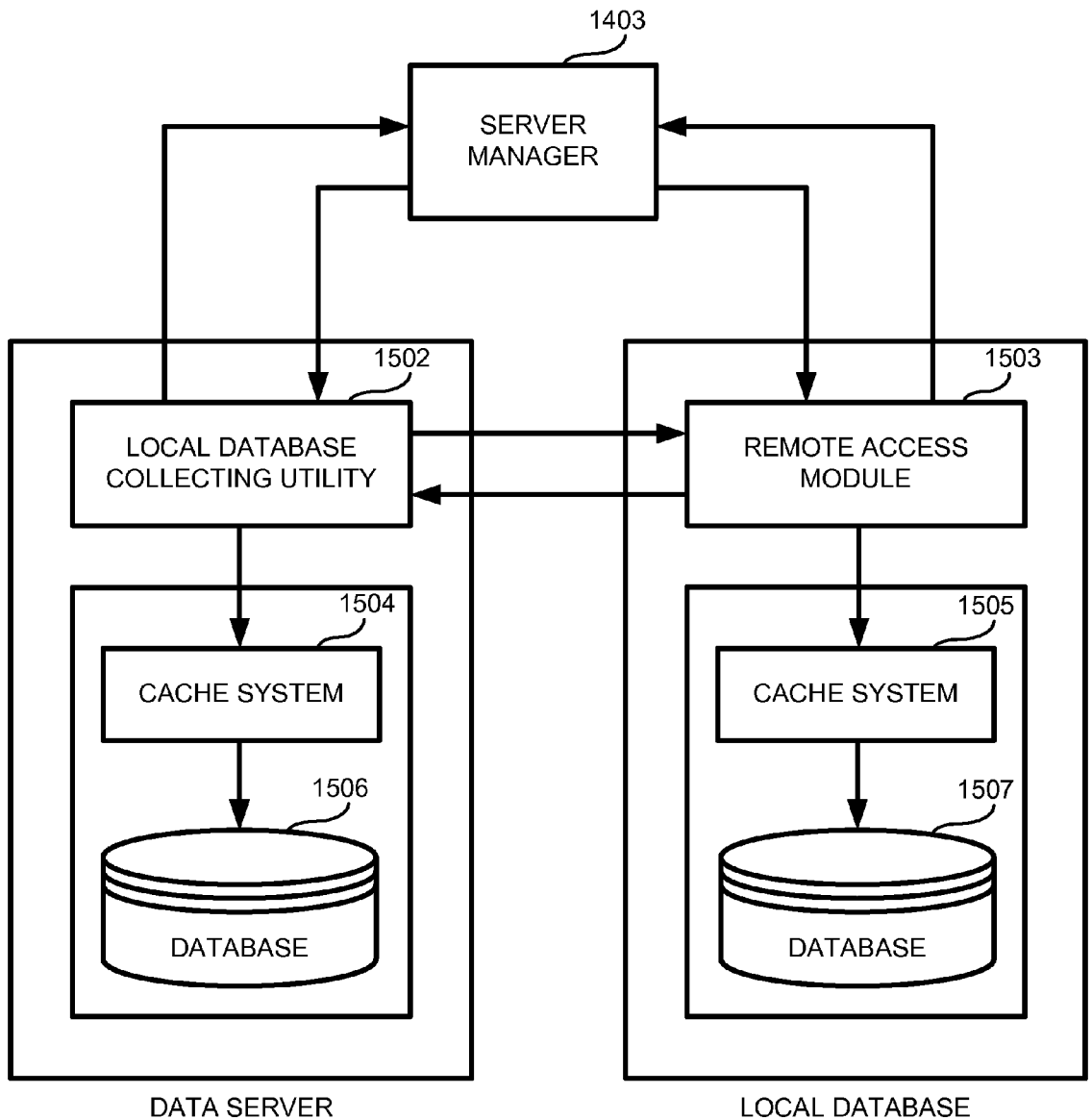
FIG. 15 illustrates a process of handling database queries and updates in accordance with an exemplary embodiment.

FIG. 15 illustrates a process of handling database queries and updates in the preferred embodiment. Local databases 1506 and 1507 are used for updating the global backup of the database 1405 (see FIG. 14). Since the configuration settings of the physical servers and the VEEs are stored on these servers, they are also included as a part of the database 1405 (see FIG. 14). The process of updating the settings in the global backup of the database 1405 is implemented either by the server manager 1403 or directly by a server administrator who explicitly changes the configuration parameters of the particular server.

Data updates are implemented in the same way on the database 1405 and on the local databases 1506 and 1507. A request is first directed to a buffer cache (not to the hard disk of a database). Functioning of the cache affects the work of the entire system. All of the data is loaded directly into the cache buffers. The updates are performed in the cache buffers. Thus correct setting of an appropriate buffer size is important. The data blocks requested most frequently remain in the cache for the longest time. The local database management system includes a remote access module 1503 that facilitates querying the data stored in the database 1507 and sending the retrieved data through the network. The remote access module 1503 allows multiple users-administrators to concurrently access the database 1507.

The system for managing global database 1405 (see FIG. 14) employs a local database collecting utility 1502 that collects data from caches 1504 and 1505 of local backups of databases 1506 and 1507 respectively. The collecting utility 1502 stores the collected data in a global database 1405 (see FIG. 14) on a hard disk. The local database collecting utility 1502 sets up parameters of the backup created on a server side. It also configures collection of data from the local databases 1506 and 1507.

The collecting utility 1502 includes information channels that reflect a state of a disk of a global database 1405 on the server. The information channels also reflect a state of local backups and utilities used for data collection. During the system operation the data is supplied to the global database 1405 only from caches 1504 and 1505 of the local servers. Requests for statistical data regarding the states of the local backups or requests for full clean up of the local backups are also processes by the collecting utility 1502.

The approach to data handling in the preferred embodiment is based on a concept of a global database. All data changes and updates taking place on individual servers can be accessible for other users-administrators only after these data changes/updates are implemented in the global database. Sending data for the individual servers is implemented as a data exchange "request-response" scheme. Any common network communication protocols can be used for data transfer. In one embodiment, VEEs on one physical machine can have an interface that supports a particular network protocol.

A database management system, according to the preferred embodiment, can function in different regimes. For example, a continuous uninterrupted backup of data on an individual server with a periodic data transfers to the global backup server. In this regime, only the data accumulated on a hard disk since the last data transfer is sent to the global backup server. Also an uninterrupted backup of data can be implemented by a continuous data transfer to the global database. In this regime the data is read directly from a cache and the data is written on the disk only in case of a network failure.

Generally, the regime of a database management system is defined by a user-administrator by setting the following: a size of a cache buffer, a number of variables that are subject to backup and configurations of a network used for transfer of data. The regime of the database management system is also affected by a frequency of changes in the values of the backed up objects.

In order to keep track of the system operation, a journal of transactions is maintained. This journal serves as a main component of the database management system. All changes/updates are reflected in the transaction journal. The transaction journal is used for restoration of integrity of the database using control check points in case of system failure. The journal records for each database are stored in one or more OS files. These files are called "journal files."

The journal files keep a sequential record of all changes of the database and also information regarding which changes had been implemented during each transaction. A successful completion or a rollback for each transaction is also recorded in the journal. Thus, transactions can be reproduced according to the journal. The changes are recorded into the database in the same order as it was done during the execution of the original transactions. Therefore, the database is brought to a state it was in at the point of creation of a backup copy of the journal.

Figure 16:
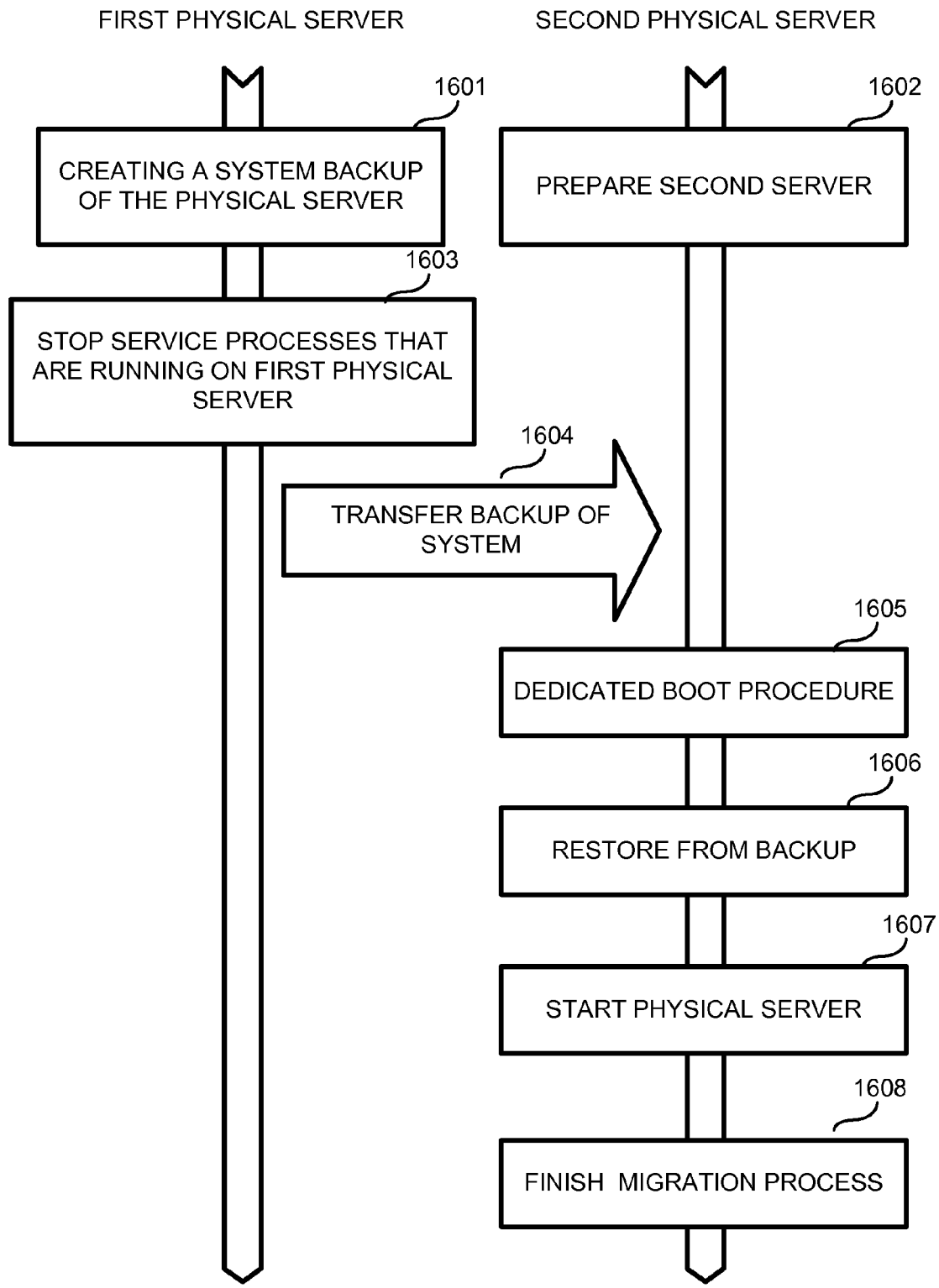
FIG. 16 illustrates a diagram of migration of a system from one physical server to another physical server in accordance with an exemplary embodiment.

A diagram of migration of the system from one physical server to another physical server is illustrated in FIG. 16. First, a backup copy of the physical server is created in step 1601. Simultaneously, preparation of the second (i.e., target) physical server is performed (step 1602). The hardware configuration of the second server is analyzed. The new server being migrated should have an identical hardware configuration as the target server. The processes and services are shut down on a first server (step 1603) and the backup copy (i.e., image) is transferred to the target server (step 1604). The Operating System is started on the target server (step 1605) by a dedicated driver using the image. The first server is restored from the backup on the target server (step 1606). The first server is started at the new location (step 1607) and the migration process is completed (in step 1608).

Figure 17:
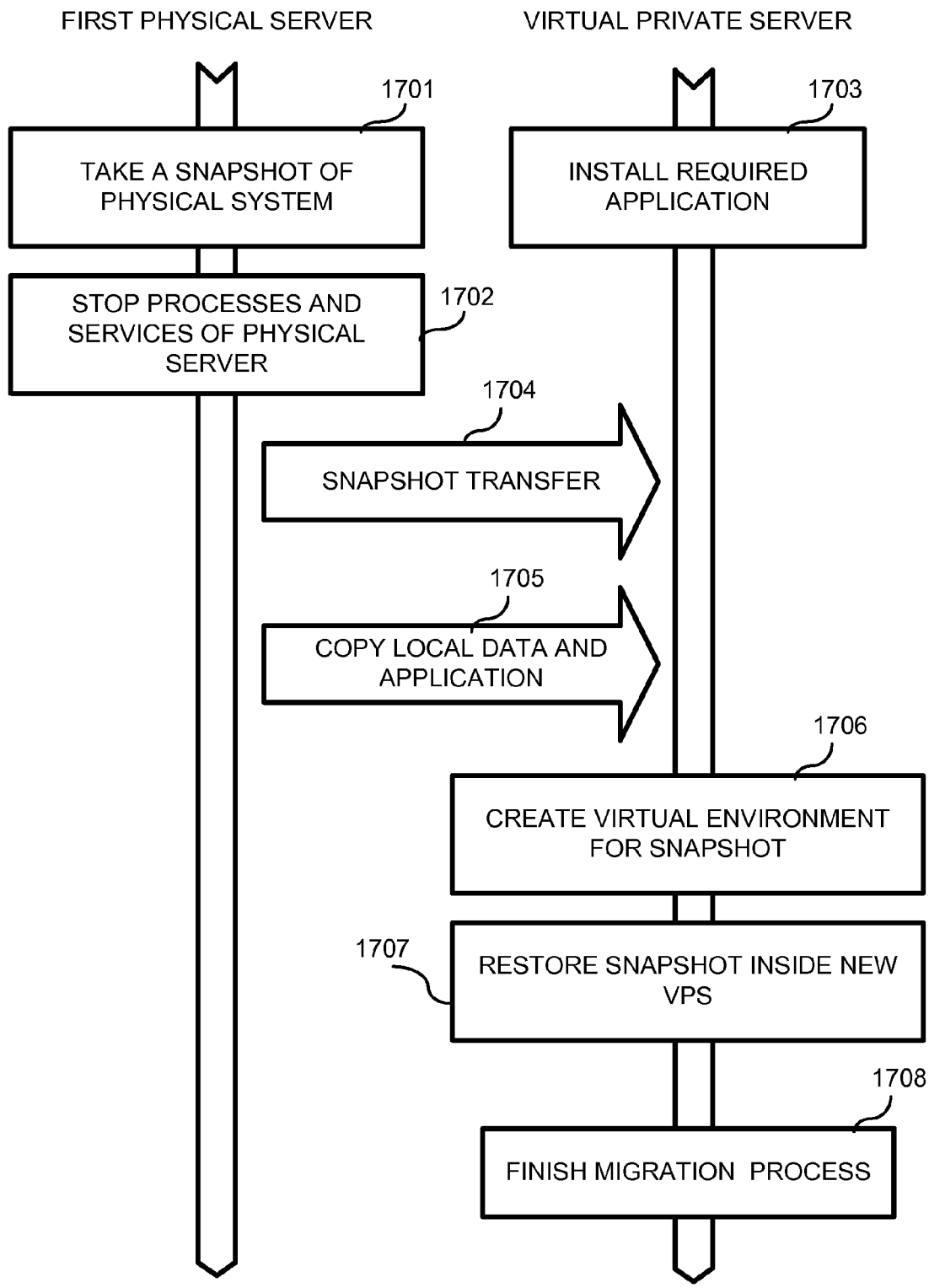
FIG. 17 illustrates a diagram of migration of a physical server into a Virtual Environment in accordance with an exemplary embodiment.

FIG. 17 illustrates a diagram of migration of a physical server into a VE. First a special application, e.g., SWagent available from SWsoft, Inc., is installed on a target physical server (step 1702). Then a snapshot of a system of the first physical server is created (in step 1701). The processes and services are shut down on a first physical server (step 1703) and the snapshot is transferred to the target server (step 1704). Local data and applications are also copied to the target server (step 1705). A VEE (i.e. VE) for the snapshot is created (step 1706) and the snapshot is restored inside the new VE (step 1707). The migration process is completed (step 1708).

Figure 18:
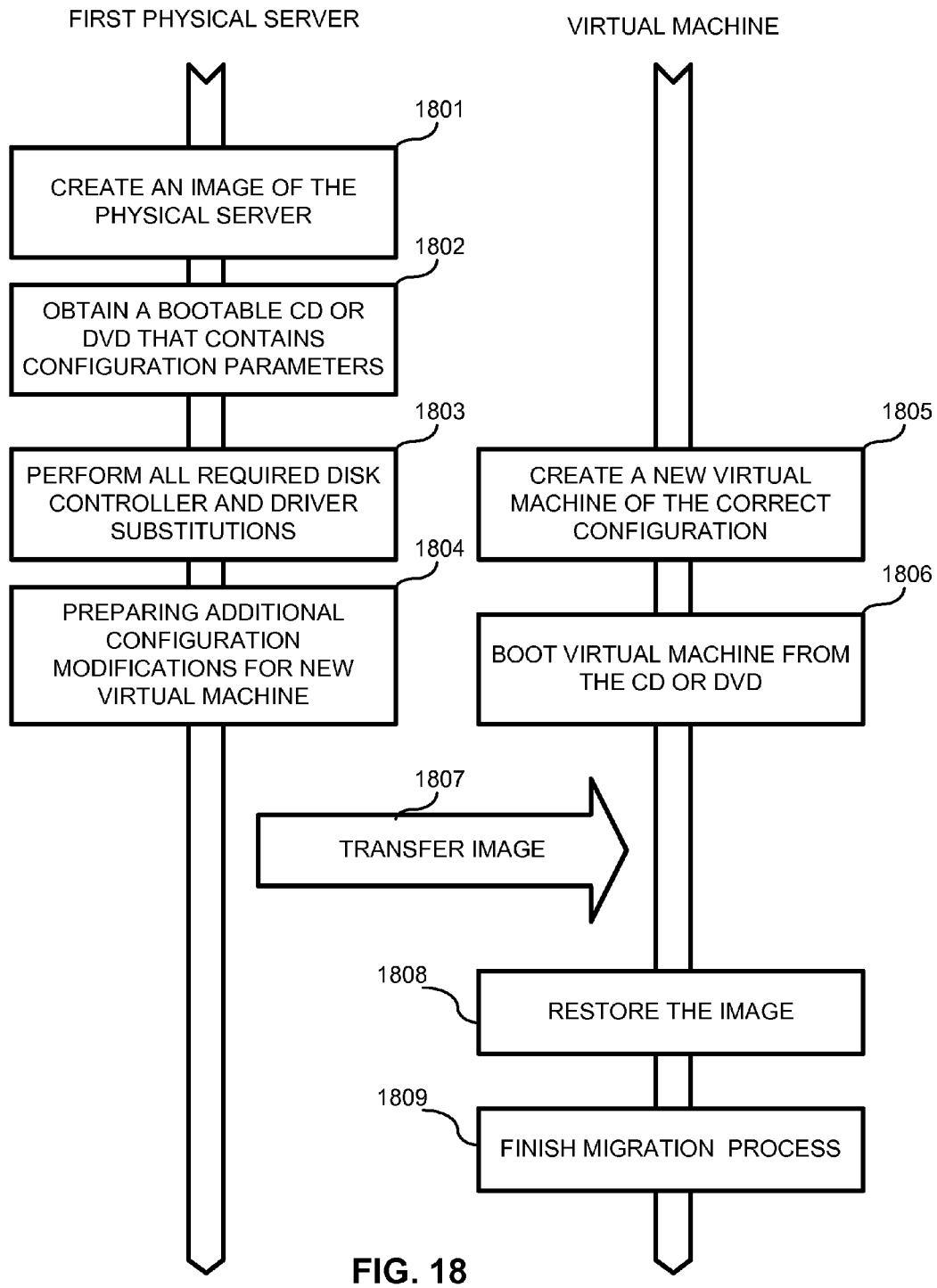
FIG. 18 illustrates a diagram of migration of a physical server into a Virtual Machine (VM) in accordance with an exemplary embodiment.

FIG. 18 illustrates a diagram of migration of a physical server into a Virtual Machine (VM). The image of the physical server is created in step 1801. The bootable disk (i.e., CD or DVD) containing configuration parameters for the new VM is created (step 1802). Required disk controller and driver controller substitutions are performed (step 1803).

Additional configuration modifications for the new VM are implemented (step 1804). The new VM is created according to the configuration created in step 1804. The new VM is loaded from the disk created in step 1802. The image is then transferred into the VM (step 1807) and restored in step 1808. The migration process is finished in step 1809.

Figure 19:
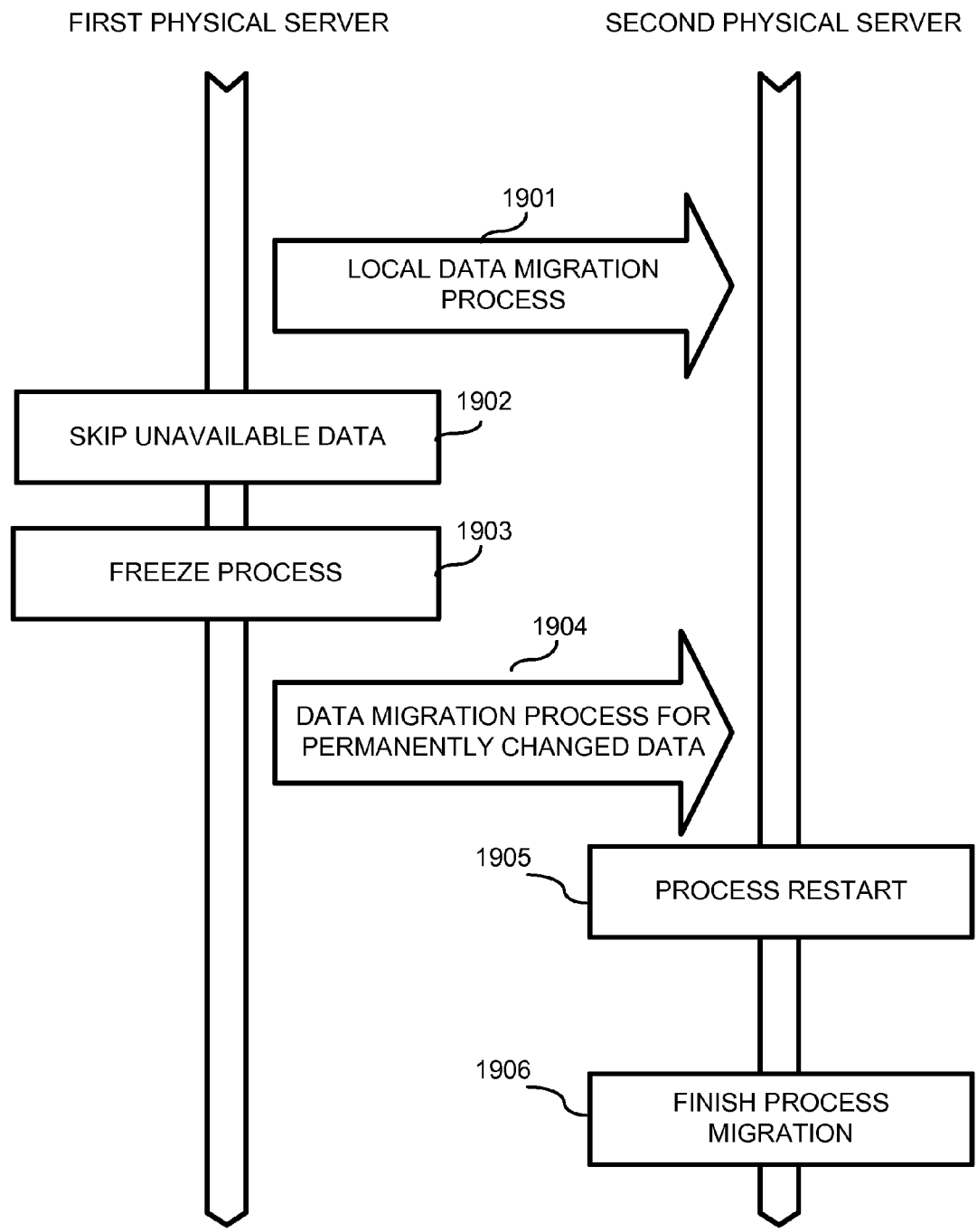
FIG. 19 illustrates a diagram of migration of a Virtual Environment from one physical server into another Virtual Environment on a different physical server in accordance with an exemplary embodiment.

FIG. 19 illustrates a diagram of migration of a VE from a physical server into another VE on a different physical server. For migration of the VE from one physical server to another, the same version of the OS template has to be installed on both servers. The data migration method with minimized downtime is implemented in the preferred embodiment. A two-phase migration procedure, discussed above, advantageously reduces planned service downtime. During migration, only critical data related to the processes executed at a time of creation of an image of the VE is transferred. All other data is loaded upon request after the VE is restored at the target location.

As shown in FIG. 19, transfer of local data from the first server to the target server is performed in step 1901. Local data transfer is performed in two phases: partial transfer prior to shutting down the processes on the first server and full data transfer after the server shut down. The two-phase migration method speeds up the execution of the data transfer after the server shut down thereby reducing the server down-time. Unavailable data is skipped in step 1902 in phase one. Then the processes are frozen on the first server in step 1903. During the phase two, mostly the data that has changed since the completion of the phase one is transferred (step 1904). After the phase two is completed, the processes and services can be restarted on the target server (step 1905). Note that the server down-time period equals the length of the phase two of the migration process. The migration process is completed in step 1906.

Figure 20:
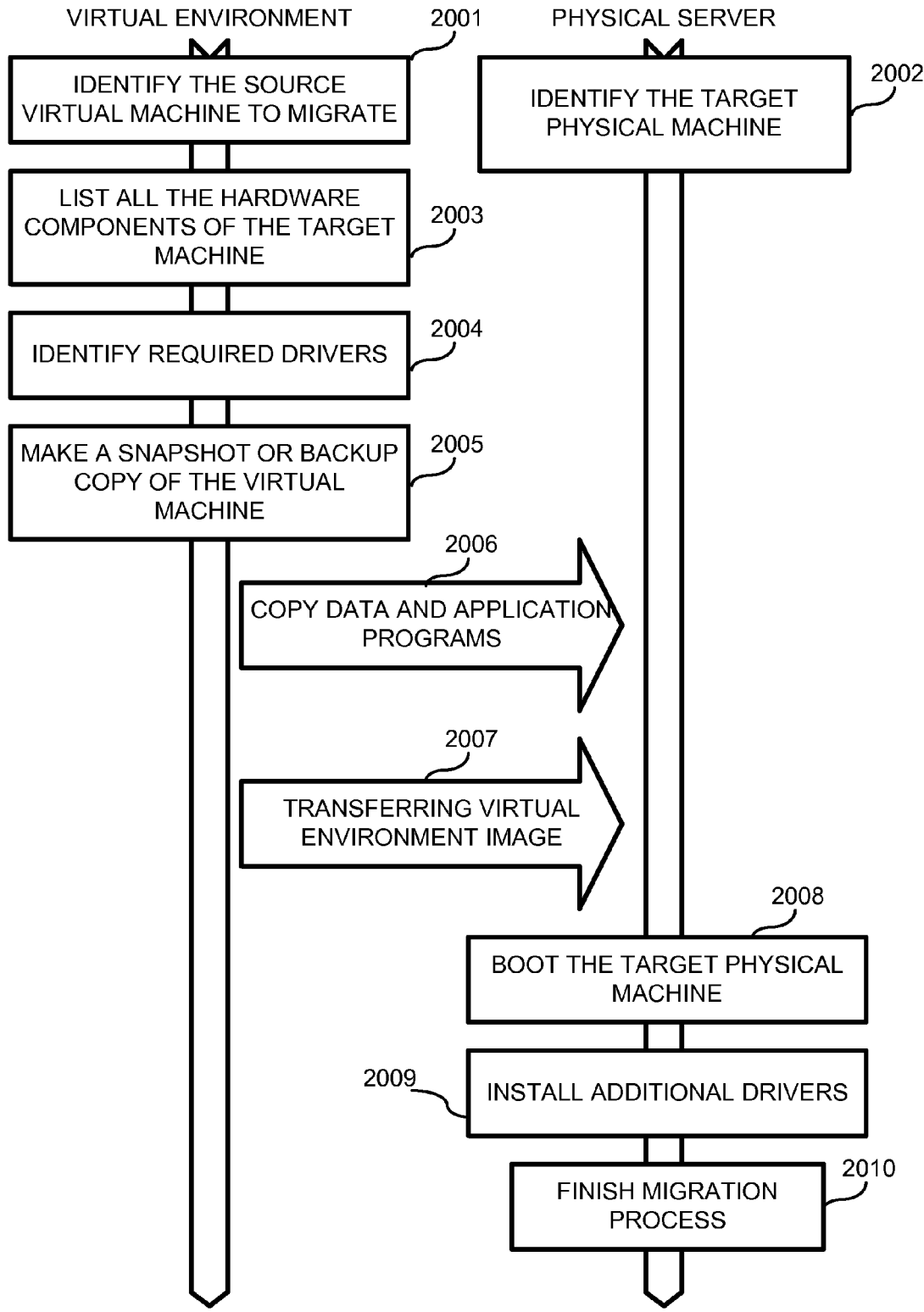
FIG. 20 illustrates a diagram of migration of a Virtual Environment to a physical server in accordance with an exemplary embodiment.

FIG. 20 illustrates migration of a VEE (here, a VM) to a physical server. First, a source VM to be migrated is identified (step 2001). The target physical server is identified in step 2002. Hardware components of the target physical server are also identified and listed in step 2003. The drivers required for VM migration are listed in step 2004. For VM migration, special utilities and drivers have to be prepared on the VM being migrated. The old drivers need to be replaced with the new ones according to hardware components identified in step 2003 on the target physical server. The directories for all drivers needed during migration are created.

A snapshot or a backup copy of the VM, including its disk data, memory contents, registers, system registry, and so on, is created in step 2005 and the VM is shut down. The data and the application programs are copied in step 2006 onto the target physical server. The image (i.e., snapshot) of the VM is transferred onto the target physical server in step 2007. The target physical server is booted up in step 2008. Additional drivers are installed in step 2009 and parameters are set according to the hardware configuration of the target server. The migration process is completed in step 2010.

Having thus described a preferred embodiment of a system and method for managing multiple VEEs implemented on multiple physical servers, it should be apparent to those skilled in the art that certain advantages of the described method and apparatus have been achieved. In particular, it should be appreciated by those skilled in the art that system and method described in the preferred embodiment provide for efficient centralized remote management and administration of multiple physical and virtual servers. It should also be appreciated that various modifications, adaptations, and alternative embodiments thereof may be made within the scope and spirit of the present invention. The invention is further defined by the following claims.

What is claimed is:

1. A system for remote administration of multiple servers, the system comprising:
   a plurality of physical servers;
   a plurality of Virtual Execution Environments (VEEs) running on the physical servers, each VEE comprising a virtual server; and
   a central console for controlling the configuration parameters of the physical servers and the virtual servers,
   wherein the central console comprises a graphic panel, that includes a user interface for remote monitoring and administration of the physical and the virtual servers, and wherein the physical and virtual servers are administered using the graphic panel;
   a local database on each of the physical servers reflecting configuration parameters of the virtual servers running on the corresponding physical servers;
   a global database accessed by the central console and reflecting at least some of the configuration parameters of the physical and virtual servers;
   wherein the system routes the configuration parameters from the central console and the global database to the physical and virtual servers over a network and acquires the configuration parameters from the physical and virtual servers and routes them over the network to the central console, and
   wherein the system verifies that the configuration parameters are compatible with the physical and virtual servers and then applies the configuration parameters routed from the central console and the global database for configuration of the physical and the virtual servers; and
   wherein the system stores, in any of the global and local database, the configuration parameters routed to the central console from the physical and virtual servers.

2. The system of claim 1, wherein the central console displays results of application of the configuration parameters.

3. The system of claim 1, wherein the user interface is any of:
   a graphical user interface; and
   a browser-based user interface.

4. The system of claim 1, wherein the user interface of the central panel presents, to a user, a menu list of operations for controlling parameters of any of:
   physical servers;
   VEs;
   VMs;
   groups of physical servers;
   groups of VEs; and
   groups of VMs.

5. The system of claim 4, wherein the operations are simultaneously performed on any of:
   a VE and a VM;
   a VE and a physical server;
   a VM and a physical server; and
   a VE and a VM and physical server.

6. The system of claim 4, wherein the user interface allows selection of operations and selection of options for each operation,
   wherein the user interface allows selection of physical and virtual servers for each operation, and
   wherein the user interface allows selection of graphical objects corresponding to different types of servers and performing group operation with the selected objects.

7. The system of claim 6, wherein the user interface renders a result of an execution of the selected operations.

8. The system of claim 4, wherein the menu list of the operations includes at least one conversion operation and wherein the conversion operation comprises any of:
  conversion of a VE into a VM;
  conversion of a VM into a VE;
  conversion of physical server into a VE; and
  conversion of a VE into a physical server;
  conversion of a physical server to a physical server with different configuration parameters.

9. The system of claim 4, wherein the user interface displays results of the operations performed on combination of a VE and a physical server.

10. The system of claim 4, wherein the operations comprise any of:
  creation of a VE;
  VE start up;
  VE shut down;
  installation of applications on a VE;
  VE backup generation;
  VE restoration from backups;
  changing of parameters of resources allocated for VE;
  conversion of VE into different formats;
  VE monitoring;
  VE configuration;
  managing VE resources;
  reporting VE events; and
  collection of VE statistics.

11. The system of claim 4, wherein the operations comprise at least one server migration.

12. The system of claim 11, wherein the server migration comprises any of:
  configuration of physical servers;
  configuration of VEs;
  activation of the physical servers;
  activation of VEs;
  migration of parameters of operating system;
  installation of applications;
  activation of backup process;
  installation of application templates;
  migration with minimal planned downtime;
  renewing host names; and
  renewing server IP addresses.

13. The system of claim 4, wherein the operations performed on the groups of servers are scheduled by an administrator through the central console.

14. The system of claim 4, wherein the operations that change configuration parameters are controlled by the central console.

15. The system of claim 1, wherein the VEEs comprise Virtual Environments (VEs).

16. The system of claim 1, wherein the VEEs comprise Virtual Machines (VMs).

17. The system of claim 1, wherein the central console pushes new configuration parameters to the physical and virtual servers.

18. The system of claim 1, further comprising a plurality of central consoles for controlling the configuration parameters of the same physical server.

19. The system of claim 1, wherein the central console polls and saves updated besides the central console configuration parameters of to the physical and virtual servers.

20. A system for managing of physical and virtual servers, the system comprising:
  a plurality of physical servers;
  a plurality of Virtual Execution Environments (VEEs) running on the physical servers, each VEE comprising a virtual server;
  a server manager for processing management requests routed from a central console,
  a global database for storing configuration parameters of the physical servers and the virtual servers, and a local database on each physical server for storing configuration parameters of the corresponding virtual servers, the global database reflecting at least some of the configuration parameters of the physical and virtual servers;
  wherein the system routes the configuration parameters from the central console and the global database to the physical and virtual servers over a network and acquires the configuration parameters from the physical and virtual servers and routes them to a cache of the server manager over the network;
  wherein the server manager synchronizes contents of the cache with the global database; and
  wherein the system verifies compatibility of the routed parameters with the server being administered and then applies the configuration parameters routed from the central console and the global database to the physical and the virtual servers; and
  wherein the system stores, in any of the global and local database, the configuration parameters routed to the central console from the physical and virtual servers.

21. The system of claim 20, wherein the database is automatically updated when the configuration parameters are changed.

22. A method for remote administration of multiple servers, the method comprising:
  creating a network of physical servers;
  activating a plurality of Virtual Execution Environments (VEEs) on the physical servers, each VEE comprising a virtual server, wherein each physical server has a local database storing configuration parameters of its VEEs;
  creating a global database for storing configuration parameters of the physical servers and the virtual servers, the global database reflecting at least some of the configuration parameters of the physical and virtual servers;
  implementing a central console for controlling the configuration parameters of the physical servers and the virtual servers, wherein the central consoles accesses the global database,
  wherein the central console comprises a graphic panel, the graphic panel includes a common user interface for remote administration of the physical and the virtual servers; and
  routing, over a network, the configuration parameters from the central console and from the global database to the physical and virtual servers and acquiring the configuration parameters from the physical and virtual servers and routing them to the central console; and verifying that the configuration parameters are compatible with the physical and virtual servers and then applying the configuration parameters routed from the central console and from the global database to the physical and the virtual servers; and storing in any of the global and local database the configuration parameters routed to the central console from the physical and virtual servers.

23. The method of claim 22, further comprising monitoring the VEEs and physical servers for suspicious behavior and generating an event when such a behavior is detected.

24. The method of claim 23, wherein a warning is sent to a system administrator subsequent to the event generation.

25. The method of claim 23, wherein a warning is sent to a VEE user subsequent to the event generation.

26. A non-transitory computer usable storage medium having computer executable logic stored thereon for remote administration of multiple servers, the computer executable logic comprising computer code for implementing the method of claim 22.

* * * * *